United States Patent
Subbarao et al.

(10) Patent No.: US 10,409,511 B1
(45) Date of Patent: Sep. 10, 2019

(54) MULTI-DEVICE STORAGE SYSTEM WITH DISTRIBUTED READ/WRITE PROCESSING

(71) Applicant: Western Digital Technologies, Inc., San Jose, CA (US)

(72) Inventors: Sanjay Subbarao, Irvine, CA (US); Vladislav Bolkhovitin, San Jose, CA (US); Anand Kulkarni, San Jose, CA (US); Brian Walter O'Krafka, Austin, TX (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/024,736

(22) Filed: Jun. 30, 2018

(51) Int. Cl.
| | |
|---|---|
| *G06F 12/00* | (2006.01) |
| *G06F 3/06* | (2006.01) |
| *G06F 11/10* | (2006.01) |
| *G06F 15/173* | (2006.01) |

(52) U.S. Cl.
CPC .......... *G06F 3/0631* (2013.01); *G06F 3/0607* (2013.01); *G06F 3/0614* (2013.01); *G06F 3/0659* (2013.01); *G06F 3/0689* (2013.01); *G06F 11/1076* (2013.01); *G06F 15/17331* (2013.01)

(58) Field of Classification Search
CPC .............................. G06F 3/0631; G06F 3/0614
USPC ........................................................ 711/114
See application file for complete search history.

(56) References Cited

U.S. PATENT DOCUMENTS

| | | |
|---|---|---|
| 5,530,948 A | 6/1996 | Islam |
| 7,680,837 B2 | 3/2010 | Yamato |
| 7,934,055 B2 | 4/2011 | Flynn et al. |
| 8,473,648 B2 | 6/2013 | Chakhaiyar et al. |
| 8,583,853 B1 | 11/2013 | Lee et al. |
| 9,009,565 B1 | 4/2015 | Northcott et al. |
| 9,118,698 B1 | 8/2015 | Radovanovic |
| 9,448,924 B2 | 9/2016 | Sundaram et al. |
| 9,720,596 B1 | 8/2017 | Bono et al. |

(Continued)

FOREIGN PATENT DOCUMENTS

WO 2013022915 A1 2/2013

OTHER PUBLICATIONS

Zhang, Jiacheng, et al., ParaFS: A Log-Structured File System to Exploit the Internal Parallelism of Flahs Devices,: 2016 USENIX Annual Technical Conference, Jun. 22-24, 2016, 15 pages.

(Continued)

*Primary Examiner* — Jae U Yu
(74) *Attorney, Agent, or Firm* — Patent Law Works LLP

(57) ABSTRACT

Example multi-device storage systems and methods provide disaggregated read/write operations. Read and/or write data requests are received from a host system at a storage controller for a plurality of storage devices. A target service host storage device is identified that hosts a target portion of a logical map of storage locations distributed among the plurality of storage devices. The target service host storage device identifies a destination storage device corresponding to a target location for the request. A data transfer from the host system to the destination storage device is processed for the request and the logical map of the target service host device is updated. The target service host storage device and the destination storage device may be different storage devices among the plurality of storage devices.

20 Claims, 10 Drawing Sheets

(56) References Cited

U.S. PATENT DOCUMENTS

| | | | |
|---|---|---|---|
| 2003/0046497 A1* | 3/2003 | Dandrea | G06F 11/1076 |
| | | | 711/154 |
| 2008/0034153 A1 | 2/2008 | Lee et al. | |
| 2009/0150605 A1 | 6/2009 | Flynn et al. | |
| 2011/0072207 A1 | 3/2011 | Jin et al. | |
| 2012/0179869 A1 | 7/2012 | Flynn et al. | |
| 2012/0278686 A1 | 11/2012 | Tang et al. | |
| 2012/0284460 A1 | 11/2012 | Guda | |
| 2013/0046949 A1 | 2/2013 | Colgrove et al. | |
| 2014/0101369 A1 | 4/2014 | Tomlin et al. | |
| 2014/0365719 A1 | 12/2014 | Kuzmin et al. | |
| 2015/0067244 A1 | 3/2015 | Kruger | |
| 2015/0089282 A1 | 3/2015 | Taranta, II | |
| 2015/0254178 A1 | 9/2015 | Van Aken | |
| 2016/0054920 A1 | 2/2016 | Patterson, III | |
| 2016/0070652 A1 | 3/2016 | Sundararaman et al. | |
| 2016/0320989 A1 | 11/2016 | Bromberg et al. | |
| 2016/0357461 A1 | 12/2016 | Tsao et al. | |
| 2016/0371145 A1 | 12/2016 | Akutsu et al. | |
| 2017/0185543 A1 | 6/2017 | Nieuwejaar | |
| 2018/0054217 A1 | 2/2018 | Schwaderer | |

OTHER PUBLICATIONS

U.S. Appl. No. 15/722,666, filed Oct. 2, 2017 by Bolkhovitin et al.
International Search Report and Written Opinion of Application No. PCT/US2018/052376, dated Dec. 10, 2018, p. 1-13.
International Search Report and Written Opinion of Application No. PCT/US2018/052389, dated Dec. 10, 2018, p. 1-13.
International Search Report and Written Opinion of Application No. PCT/US2019/020165, dated Jun. 21, 2019, p. 1-16.

* cited by examiner

MULTI-DEVICE STORAGE SYSTEM WITH DISTRIBUTED READ/WRITE PROCESSING

TECHNICAL FIELD

The present disclosure generally relates to data storage systems, and in a more particular example, to disaggregated multi-device data storage systems.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips from Mellanox or Kazan to translate commands from external NVMe-OF™ (Non-Volatile Memory Express™ over Fabrics) protocol to internal NVMe (NVM Express™) protocol. These architectures may not make the best use of the I/O bandwidth, processing, and buffer memory of the individual storage devices, such as solid-state drives (SSDs) in such systems. In addition, some of these architectures place significant compute resources in a centralized storage controller, which may lead to challenges scaling solutions as the number and size of SSDs increases.

Therefore, there still exists a need for disaggregated storage architectures that distribute compute resources across storage devices, such as SSDs, and enable reliable read/write and offloaded operations in the face of scaling storage systems, drive failures, and/or system power interruptions.

SUMMARY

Various aspects for read/write operations, particularly, distributed read/write operations in multi-device storage systems are described. In an innovative aspect, a system comprises a storage controller configured for receiving a data request from a host system and a plurality of storage devices in communication with the storage controller. The storage controller comprises a first processor, a first memory, and a service mapping module stored in the first memory and executable by the first processor for identifying a target service host storage device from a plurality of storage devices. The target service host storage device hosts a target portion of a logical map of storage locations distributed among the plurality of storage devices. Each storage device comprises a second processor, a second memory, a storage medium, a portion of the logical map stored in the second memory, a service host module, a media manager module, and a logical map update module. The service host module is stored in the second memory and executable by the second processor for identifying a destination storage device from among the plurality of storage devices. The destination storage device corresponds to a target storage location for the data request based on the portion of the logical map. The media manager is stored in the second memory and executable by the second processor for processing a data transfer between the target storage location on the storage medium or media and the host system. The logical map update module is stored in the second memory and executable by the second processor for updating the portion of the logical map stored in the second memory based on the data transfer between the target storage location on the storage medium or media and the host system.

In various embodiments, the plurality of storage devices each further comprise a buffer memory and a remote direct memory access interface for accessing the buffer memory over an interconnect fabric external to the plurality of storage devices. The media manager transfers data between the target storage location on the storage medium or media and the buffer memory. The host system transfers data between the host system and the buffer memory. The storage controller may further comprise a buffer manager stored in the first memory and executable by the first processor. The buffer manager may allocate the buffer memory of the plurality of storage devices for processing of the data request, send a data transfer command to the destination storage device to transfer data between the target storage location and the allocated buffer memory, and send a buffer access command to the host system to transfer data between the host system and the allocated buffer memory. The data transfer command may be executed after a full redundant array of independent disk (RAID) stripe for the data request has been assembled in the buffer memory of the plurality of storage devices. The buffer manager may be further executable for serializing a plurality of data requests across the buffer memory of each of the plurality of storage devices. The storage medium or media may be configured for receiving data units of a predefined size and the buffer memory may be allocated in the data units of the predefined size.

In some embodiments, the target portion of the logical map includes a parity identifier for a target parity storage device from among the plurality of storage devices. The plurality of storage devices each further comprise an exclusive-OR (XOR) buffer and a parity module stored in the second memory and executable by the second processor. The parity module receives data from the destination storage device, calculates parity data from the received data, and stores the parity data in the XOR buffer. The parity module may be further executable for receiving mapping information related to the received data and updating a parity storage location in the portion of the logical map stored in the second memory using the received mapping information. The destination storage device and the target parity storage device may be different storage devices among the plurality of storage devices. A media logical map may be stored in the second memory and identify media storage locations in the storage medium or media having a storage device write size. The storage device write size may be larger than a host write size of the data request and the portion of the host logical map may use the host write size for mapping data locations. The target service host storage device and the destination storage device may be different storage devices among the plurality of storage devices.

In another innovative aspect, a computer-implemented method provides distributed write processing. A write data request is received from a host system at a storage controller for a plurality of storage devices. A target service host storage device is identified from the plurality of storage devices. The target service host storage device hosts a target portion of a logical map of storage locations distributed among the plurality of storage devices. A destination storage device is identified from among the plurality of storage devices. The destination storage device corresponds to a target storage location for the write data request. A data transfer from the host system to the destination storage device is processed for the write data request. The target portion of the logical map in the target service host storage device is updated based on the data transfer between the host system and the destination storage device. The target service host storage device and the destination storage device may be different storage devices among the plurality of storage devices.

In various embodiments, processing the data transfer further comprises transferring data between the host system and a buffer memory in the destination storage device, and transferring data between the buffer memory and the target storage location on a storage medium of the destination storage device. The method may further comprise allocating the buffer memory of the plurality of storage devices for processing of the write data request, sending a buffer access command to the host system to transfer data between the host system and the allocated buffer memory, and sending a data transfer command to the destination storage device to transfer data between the allocated buffer memory and the target storage location on the storage medium or media of the destination storage device. The method may further comprise assembling a full stripe for the write data request in the buffer memory of the destination storage device. The data transfer command may be sent after the full stripe for the data request has been assembled in the buffer memory. The method may further comprise serializing a plurality of write data requests across a plurality of buffer memories in the plurality of storage devices. The storage medium or media may be configured for receiving data units of a predefined size and the buffer memory is allocated in the data units of the predefined size.

In some embodiments, the method further comprises identifying a target parity storage device from among the plurality of storage devices. The target parity storage device receives data from the destination storage device, calculates parity data from the received data; and stores the parity data in a XOR buffer of the target parity storage device. The method may further comprise receiving mapping information related to the received data in the target parity storage device and updating a parity storage location in a portion of the logical map stored in the target parity storage device using the received mapping information. The destination storage device and the target parity storage device may be different storage devices among the plurality of storage devices.

In yet another innovative aspect, a system provides distributed write operations. Means are provided for receiving a write data request from a host system at a storage controller for a plurality of storage devices. Means are provided for identifying a target service host storage device from the plurality of storage devices. The target service host storage device hosting a target portion of a logical map of storage locations distributed among the plurality of storage devices. Means are provided for identifying a destination storage device from among the plurality of storage devices. The destination storage device corresponding to a target storage location for the write data request. Means are provided for processing a data transfer from the host system to the destination storage device for the write data request. Means are provided for updating the portion of the logical map in the target service host storage device based on the data transfer between the host system and the destination storage device. The target service host storage device and the destination storage device are different storage devices among the plurality of storage devices.

The various embodiments advantageously apply the teachings of disaggregated multi-device storage systems to improve the functionality of such computer systems. The various embodiments include operations to overcome or at least reduce the issues in the previous storage systems discussed above and, accordingly, are more scalable and reliable than other computer data storage architectures for some applications. That is, the various embodiments disclosed herein include hardware and/or software with functionality to improve the scalability and reliability of disaggregated read/write operations, based on distributing read/write operations and related logical mapping across a plurality of storage devices. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
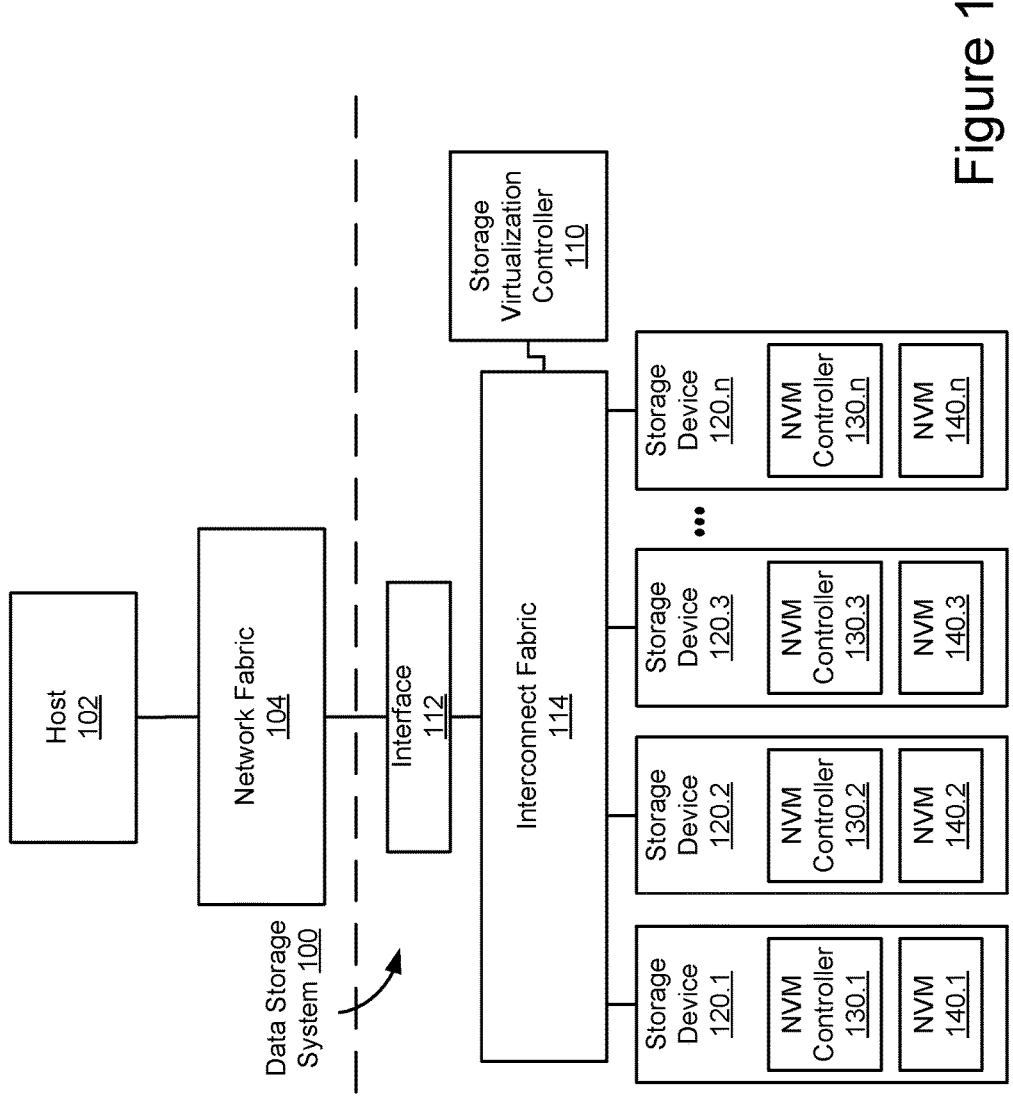
FIG. 1 schematically illustrates an example of a multi-device storage system.

FIG. 1 shows an embodiment of an example multi-device data storage system 100. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices).

In some embodiments, the data storage devices 120 are, or include, solid-state drives (SSDs). Each data storage device 120.1-120.*n* may include a non-volatile memory (NVM) controller 130 based on compute resources (processor and memory) and a plurality of NVM devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single NVM device 140 while in other embodiments the respective data storage device 120 includes a plurality of NVM devices. In some embodiments, NVM devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage medium or media (e.g., phase-change random access memory (PCRAM), resistive random-access memory (ReRAM), Spin-transfer torque magnetic random-access memory (STT-RAM), magnetoresistive random-access memory (MRAM), etc.).

Storage virtualization controller (SVC) 110 is coupled to data storage devices 120.1-120.*n* through interconnect fabric 114. However, in some embodiments, SVC 110 may be hosted as a component and/or a subsystem of another component of data storage system 100. For example, in some embodiments, some or all of the functionality of SVC 110 may be implemented by software executed on one or more compute resources in at least one of data storage devices 120.1-120.*n*, interconnect fabric 114, or interface 112. SVC 110 is sometimes called a controller system, a main controller system, a non-volatile memory express (NVMe) controller, garbage collection (GC) leader, storage controller, or storage virtualization controller. In some embodiments, an NVM controller 130.1 associated with a particular storage device (e.g., 120.1) acts as SVC 110 for other storage devices (e.g., 120-2, 120-3, and 120.*n*) in data storage system 100. In some embodiments, SVC 110 is a component and/or subsystem of host 102 (described below).

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from SVC 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more NVM controllers 130, if included in a respective storage device 120, are coupled with SVC 110 through interconnect fabric 114. Interconnect fabric 114 is sometimes called a data connection, but typically convey commands in addition to data, and optionally convey metadata, error correction information and/or other information in addition to data values to be stored in NVM devices 140 and data values read from NVM devices 140.

In some embodiments, however, SVC 110, the one or more NVM controllers 130, and NVM devices 140 are included in the same device (i.e., an integrated device) as components thereof. Furthermore, in some embodiments, one or more of the storage devices 120 (e.g., including SVC 110, the one or more NVM controllers 130, and NVM devices 140) are embedded in a host device (e.g., host 102), such as a mobile device, tablet, other computer or computer-controlled device, and the methods described herein are performed, at least in part, by the embedded storage controller. In some embodiments, NVM controllers 130 are configured to both control one or more NVM devices 140 and provide distributed storage controller functions in conjunction with SVC 110.

In some embodiments, storage devices 120 include a plurality of NVM devices 140, such as flash memory devices, and optionally includes fewer NVM controllers 130. Viewed another way, in some embodiments, a storage device 120 includes multiple memory channels, each of which has an NVM controller 130 and a set of NVM devices 140 coupled to the NVM controller 130. However, in some embodiments, two or more memory channels share an NVM controller 130. In either example, each memory channel has its own distinct set of NVM devices 140. In a non-limiting example, the number of memory channels in a typical storage device is 8, 16, or 32. In another non-limiting example, the number of NVM devices 140 per memory channel is typically 8, 16, 32, or 64. Furthermore, in some embodiments, the number of NVM devices 140 in one memory channel is different from the number of NVM devices in another one of the memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. As noted above, NVM devices 140 are coupled to NVM controllers 130 through connections that typically convey commands in addition to data, and optionally convey metadata, error correction information and/or other information in addition to data values to be stored in NVM devices 140 and data values read from NVM devices 140. NVM devices 140 may include any number (i.e., one or more) of memory devices including, without limitation, non-volatile semiconductor memory devices, such as flash memory device(s).

Flash memory device(s) (e.g., NVM devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., NVM devices 140) can also be configured for relatively smaller-scale applications such as personal flash drives or hard-disk replacements for personal, laptop, and tablet computers. Although flash memory devices and flash controllers are used as an example here, in some embodiments, storage device(s) 120 include other non-volatile memory device(s) and corresponding non-volatile storage controller(s).

In some embodiments, NVM devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
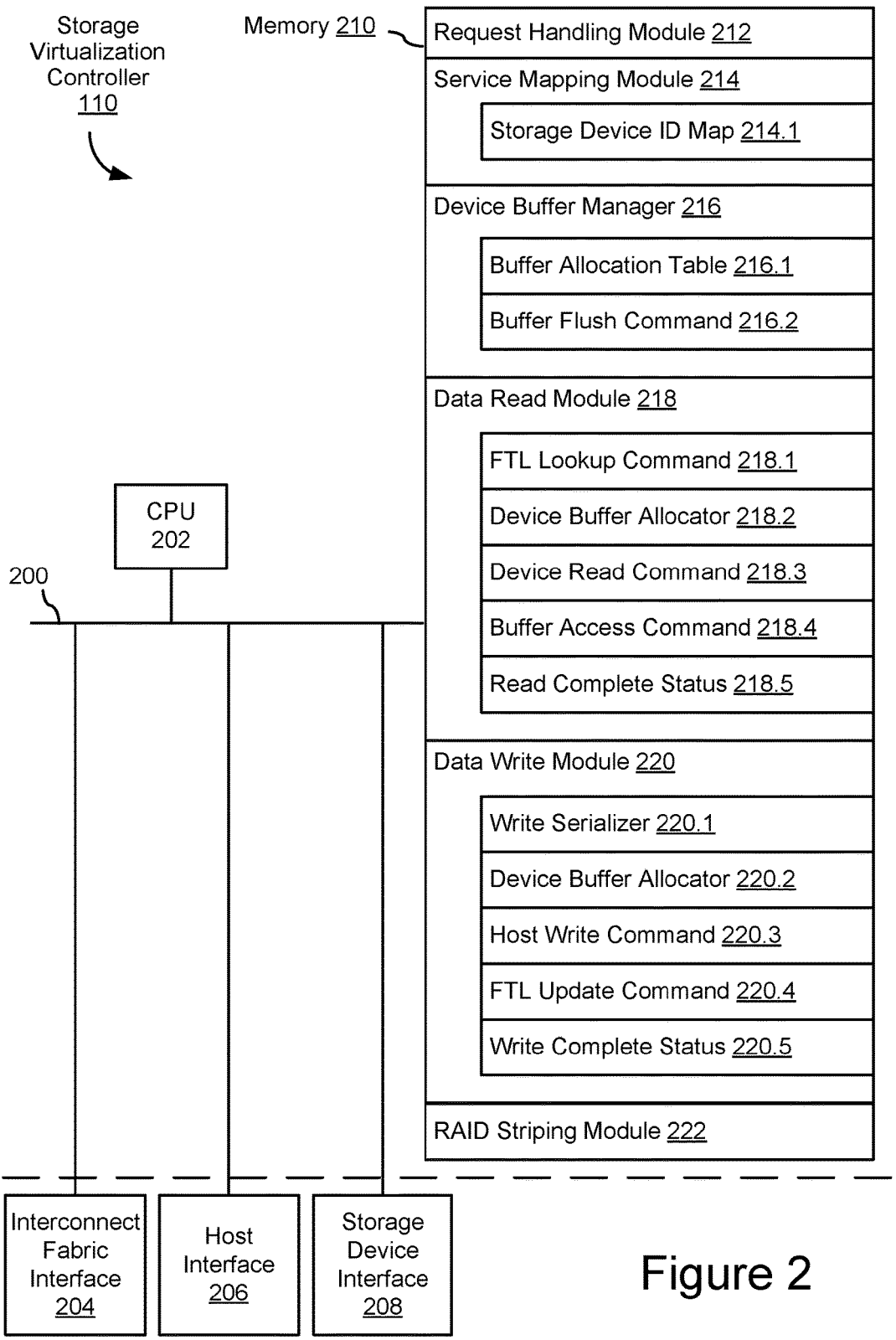
FIG. 2 schematically illustrates an example of a storage virtualization controller of the multi-device storage system of FIG. 1 may operate.

FIG. 2 is a block diagram illustrating an example storage virtualization controller (SVC) 110, in accordance with some embodiments, as shown in FIG. 1. A host may access storage in a storage system by sending read/write commands to SVC 110. In some embodiments, SVC 110 may be a control path only component and not in the data path. Data associated with read/write commands is transferred between storage devices and host systems or from storage device to storage device without passing through SVC 110. For example, SVC 110 may communicate (directly or indirectly) with remote data management system (RDMS) engines in the hosts, storage devices, interconnect fabric, network interfaces, etc. to establish data transfers from one component to another without routing through SVC 110.

In some embodiments, SVC 110 controls data flow between hosts and storage devices. SVC 110 may receive commands from the host, calls storage device distributed services (e.g. host flash translation layer (FTL) services), receives status from storage devices, and provides status back to the host. In some embodiments, SVC 110 may include hardware automation to handle specific performance cases. SVC 110 may implement storage system level management of storage device resources across all storage devices in the storage array, such as allocation of media storage space, distributes services, and related processor and memory resources, including storage device buffer memory. For example, SVC 110 may manage storage device buffer memory and assign them for read/write, garbage collection operations, degraded operations, and rebuild operations. In some embodiments, SVC 110 may manage storage system level operations by calling distributed and/or offloaded services, such as host FTL services, executed by one or more storage devices.

SVC 110 typically includes one or more processing units (CPUs 202), sometimes herein called CPUs, processors, or hardware processors, and sometimes implemented using microprocessors, microcontrollers, or the like, for executing modules, programs, and/or instructions stored in memory 210 and thereby performing processing operations, memory 210 (sometimes called storage virtualization controller memory), and one or more communication buses 200 for interconnecting these components. The one or more communication buses 200 optionally include circuitry (sometimes called a chipset) that interconnects and controls communications between system components.

SVC 110 may be coupled to one or more hosts (e.g. host 102 in FIG. 1) by host interface 204 via a network fabric (e.g. network fabric 104 in FIG. 1) and is coupled to storage device(s) (e.g. storage devices 120 in FIG. 1) by storage device interface 208 via an interconnect fabric (e.g. interconnect fabric 114 in FIG. 1). In some embodiments, all communications from SVC 110 may pass through an interconnect fabric via an interconnect fabric interface 204, including host communications and storage device communications, and host communications may by routed through a storage network interface (e.g. interface 112 in FIG. 1) connected to the interconnect fabric.

Memory 210 may include high-speed random access memory, such as DRAM, SRAM, double data rate (DDR) RAM, or other random access solid state memory devices, and may include non-volatile memory, such as one or more magnetic disk storage devices, optical disk storage devices, flash memory devices, or other non-volatile solid state storage devices. Memory 210 may optionally include one or more storage devices remotely located from CPU(s) 202. Memory 210, or alternatively the non-volatile memory device(s) within memory 210, comprises a non-transitory computer readable storage medium.

In some embodiments, memory 210, or the non-transitory computer readable storage medium of memory 210 stores the following programs, modules, and data structures, or a subset or superset thereof:
  request handler 212 for receiving and managing read/write requests from a host;
  service mapping module 214 for managing the location of distributed and/or offloaded services among the storage devices in the array;
  device buffer manager 216 for managing buffer resources among the storage devices in the array:
  data read module 218 for managing read operations between the host and storage devices;
  data write module 220 for managing write operations between the host and storage devices; and RAID striping module 222 for managing the RAID striping across the storage devices in the array.

Each of the above identified elements of SVC 110 may be stored in one or more of the previously mentioned memory devices and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above. In some embodiments, the programs, modules, and data structures stored in memory 210, or the non-transitory computer readable storage medium of memory 210, provide instructions for implementing some of the methods described below. In some embodiments, some or all of these modules may be implemented with specialized hardware circuits that subsume part or all of the module functionality.

In some embodiments, request handler 212 may be configured to receive commands from a host (e.g. host 102 in FIG. 1) via host interface 206, such as host read commands and host write commands. In some embodiments, request handler 212 may receive other commands via request handler 212, such as data erase commands and/or commands related to garbage collection, data recovery, and other functions. Request handler 212 may receive a read command from the host. For example, the read command may identify a range of host logical block addresses (host LBAs) stored in the storage devices 120 of data storage system 100 from which the host requests data to be transferred to a host data location, such as a read buffer in host 102. Request handler 212 may receive a write command from the host. For example, the write command may identify a write data location, amount of data to be written, and a range of host LBAs to which the data should be written. In some embodiments, write commands may be received corresponding to a defined page size that aligns with media programming sizes, such as 4 KB pages.

In some embodiments, service mapping module 214 may include one or more tables or functions for identifying one or more offloaded or distributed services in storage devices 120. In some embodiments, service mapping module 214 may include a storage device identifier (ID) map 214.1 (also referred to as a device virtualization table) to identify which of storage devices 120 hosts the needed service for a given command or data management function. For example, in response to receiving a host read/write request, SVC 110 may need to access host LBA to storage device storage location mapping information.

In some embodiments, SVC 110 may not contain any host LBA to storage device storage location mapping information, but service mapping module 214 may provide a function for determining which of storage devices 120 does. For example, host FTL mapping information for the storage array may be distributed across multiple storage devices and service mapping module 214 may access storage device ID map 214.1 to identify which of storage devices 120 hosts the relevant portion of the host FTL mapping information. In some embodiments, a fixed function or calculation, such as modulo math may be used by service mapping module 214 to determine the storage device ID of the storage device with services relevant to the command being processed. The storage device ID may be used by SVC 110 to communicate with and control the offloaded or distributed services in storage devices 120. The storage device containing the relevant host FTL services and identified by the storage device ID may be referred to as a service host or the target service host storage device for any give service request.

In some embodiments, device buffer manager 216 may enable SVC 110 to utilize persistent memory, such as NVM controller memory buffers, across storage devices 120 to manage host data transfers and other data management functions. For example, each of storage devices 120 may include a plurality of buffers addressable through remote direct memory access (RDMA) and device buffer manager 216 may allocate buffer space for host data transfers and other data management functions.

In some embodiments, device buffer manager 216 may include a buffer allocation table 216.1 for managing buffer use among storage devices 120. For example, as host write requests are processed, buffer manager 216 provides logic for determining how host data is serialized across the buffers in different storage devices 120 based on current and/or prior use data in buffer allocation table 216.1. Algorithms used by buffer manager 216 may implement RAID configurations, load balancing, allocation of storage capacity, input/output (I/O) efficiency, and data reliability considerations to order buffer use. In some embodiments, buffer manager 216 may also be used for buffer allocation for garbage collection, data rebuild, and/or other functions.

Device buffer manager 216 may identify buffer locations in storage devices 120 and issue buffer access commands to one or more RDMA engines to initiate data transfers. In some embodiments, device buffer manager 216 maintains a log of buffer allocations across storage devices 120, such as in buffer allocation table 216.1, and issues status notifications to storage devices 120 regarding which buffers are allocated to specific host FTL services and which buffers are available to storage devices 120 for local use. In some embodiments, buffer commands from device buffer manager 216 to storage devices 120 may include a buffer flush command 216.2. For example, buffer flush command 216.2 may be sent to one or more of storage devices 120 to have the target storage device write the contents of one or more buffers to a medium or media and clear those buffers for subsequent use.

In some embodiments, data read module 218 may execute a series of actions to coordinate the execution of a host read command between storage devices 120 and host 102. When a host read command is received by request handler 212, it may initiate data read module 218. Data read module 218 may use service mapping module 214 to identify a storage device ID based on the host LBA identified in the host read command. FTL lookup command 218.1 may be sent by SVC 110 to the target service host storage device using the storage device ID. SVC may receive a response from the target host storage device identifying the storage device ID and storage device storage location for the destination storage device with the requested data in the host read command.

Device buffer allocator 218.2 may use device buffer manager 216 to request a buffer allocation in the destination storage device. Device read command 218.3 is sent to the destination storage device to initiate a data transfer from the medium or media of the destination storage device to the allocated buffer space. Buffer access command 218.4 is sent to an RDMA engine capable of pushing (and/or pulling) the read data in the allocated buffer space to the host address included in the host read command. For example, an RDMA engine in the destination storage device, the host, or elsewhere in the communication fabric and interfaces, such as a network interface card, may initiate the data transfer between the buffer in the storage device and the host. When the data transfer to the host is complete, SVC 110 may send a read complete status 218.5 to the host.

In some embodiments, data write module 220 may execute a series of actions to coordinate the execution of a host write command between storage devices 120 and host 102. When a host write command is received by request handler 212. It may initiate data write module 220. Data write module 220 may use write serializer 220.1 to determine which storage device ID a new write should be allocated to and/or how a series of writes should be allocated across multiple storage device IDs. In some embodiments, write serializer 220.1 may allocate a series of host data writes, such as 4K data block writes, to a storage device in order to fill a larger write granularity, such as 96K or 192K multiplane page sizes, before that host data is transferred to a storage medium or media. For example, write serializer 220.1 may allocate host writes to a storage device to fill a data buffer space corresponding to the preferred write granularity of the storage device. In some embodiments, storage devices may be configured for large write granularity to reduce the memory size of storage device FTL and provide memory space for host FTL.

Device buffer allocator 220.2 may use device buffer manager 216 to identify a specific buffer location in the destination storage device for the write command. For example, a buffer space may be allocated in buffer allocation table 216.1 and a buffer allocation message may be sent to the destination storage device identifying the buffer space that will be used. In some embodiments, the buffer allocation may correspond to the preferred write granularity of the destination storage device and buffer may be allocated for a series of smaller host writes to fill the allocated buffer space.

A host write command 220.3 may be sent to an RDMA engine identifying the source of the write data at a host location and the buffer space in the destination storage device. For example, an RDMA engine in the destination storage device, the host, or elsewhere in the communication fabric and interfaces, such as a network interface card, may initiate the data transfer between the buffer in the storage device and the host. Data write module 220 may use service mapping module 214 to identify a storage device ID based on the host LBA identified in the write command.

FTL update command 220.4 may be sent by SVC 110 to the target service host storage device using the storage device ID. Note that the storage device hosting the relevant portion of the host LBA mapping may not be the same as the destination storage device for the write command, so the target service host storage device for FTL update command 220.4 may be different than the destination storage device ID. SVC 110 may receive a response from the target host storage device when the relevant portion of the distributed FTL map has been updated.

When the data transfer to the destination storage device is complete and the FTL map has been updated, SVC 110 may send a write complete status 218.5 to the host. In some embodiments implementing RAID or parity error coding, the distributed services for updating the FTL map may also implement drive-to-drive RAID and/or parity data transfers and related FTL map updates.

In some embodiments, SVC 110 may coordinate RAID striping among storage devices 120 based on a selected RAID configuration. For example, RAID striping module 222 may operate in conjunction with write serializer 220.1 and device buffer manager 216 to allocate writes in RAID stripes. RAID striping module 222 may commit each portion of a RAID stripe to storage devices 120. In some embodiments, when an entire stripe has been written, buffer flush command 216.2 may be used to write the entire stripe from their respective buffers to the storage medium or media.

In an example RAID configuration, there may be one or more RAID groups in the storage system and any given storage device may participate in one or more RAID groups. The storage device FTL of individual storage devices may not implement RAID across storage media within the storage device, even if the storage device includes multiple discrete media units, such as NVM dies or packages. In some embodiments, the RAID stripes are across storage device storage locations (e.g. storage device LBAs) from different storage devices with a stripe depth equal to the device storage location granularity or storage unit sizes, such as a multi-plane programming size. For example, no two pages in a RAID stripe may be on the same media unit and no two pages in the RAID stripe may be in the same storage device. In a multi-plane programming implementation, the RAID stripe may initially be built across buffers from different storage devices such that each buffer maps exactly over a page corresponding to the multi-plane programming.

In some embodiments, parity computation is accomplished by moving data from the buffer of the destination storage device to a parity storage device using an RDMA engine for a buffer-to-buffer transfer. When the data is moved to the parity storage device, a new parity is calculated as a function of current parity and the new data, and the new parity is put back in the buffer of the parity device. In some embodiments, this may be accomplished in one atomic RDMA operation between the two storage devices without any intervention from SVC 110.

Although FIG. 2 shows SVC 110 as an architecturally isolated storage controller, FIG. 2 is intended more as functional description of the various features which may be present in a management module than as a structural schematic of the embodiments described herein. In practice, and as recognized by those of ordinary skill in the art, items shown separately could be combined and some items could be separated. In some embodiments, one or more of the operations and/or modules of SVC 110 may instead be performed and/or implemented by other components in data storage system 100. In some embodiments, one or more of the operations and/or modules of SVC 110 may instead be performed and/or implemented by one or more NVM controllers 130. For example, NVM controller 130 of storage device 120.1 may include data management logic (e.g., similar to one or more modules in memory 210 of FIG. 2) for managing the data lifetime of memory blocks of one or more of the storage devices 120.1 through 120.n. In some embodiments, the modules in memory 210 may be implemented in whole or in part by software, hardware, firmware, or any combination thereof in data storage system 100.

In some embodiments, SVC 110 may be implemented by a host system (e.g., host 102, FIG. 1) that also stores and accesses data in the plurality of storage devices 120. Furthermore, in some embodiments, SVC 110 may be implemented by a storage device (e.g., storage device 120.1, FIG. 1) in the multi-device storage environment. Still further, in some embodiments, SVC 110 may be implemented elsewhere in the communication fabric and interfaces of data storage system 100. For example, SVC 110 may be implemented as part of interconnect fabric 114, interface 112, or the host-side network fabric 104.

Figure 3:
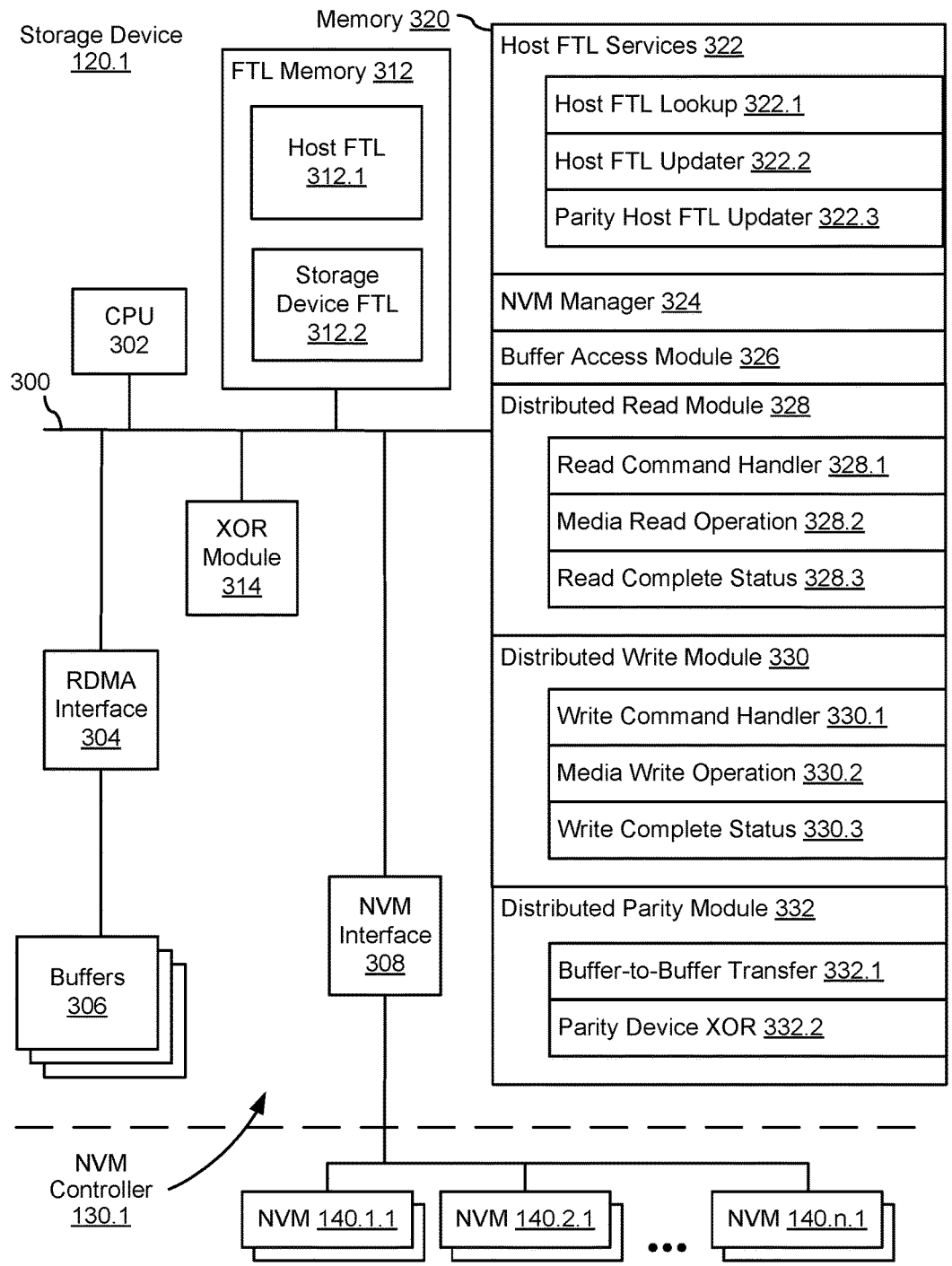
FIG. 3 schematically illustrates an example of a storage device of the multi-device storage system of FIG. 1.

In some embodiments, as shown in FIG. 3, a storage device 120 includes the functions of an NVM controller and distributed FTL services using common compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPU 302 are shared by one or more components within, and in some cases, beyond the function of storage device 120. The modules in memory 320 and executed by CPU 302 may be coupled to RDMA interface 304, NVM interface 308, and any number of additional modules, such as XOR module 314 and FTL memory 312, in order to coordinate the operation of these components. In some embodiments, CPU 302, memory 320, NVM interface 308, and any number of additional modules may be packaged as an NVM controller 130.1 implemented in an application-specific integrated circuit (ASIC), field programmable gate array (FPGA), or similar architecture.

In some embodiments, RDMA interface 304 may be a hardware, software, or combined hardware/software engine for providing remote data management access to buffers 306. This may include local direct memory access (DMA) to buffers 306 for CPU 302 or other components of NVM controller 130.1. The RDMA engines of RDMA interface 304 may allow storage device 120.1 to push or pull data from/to buffers 306 and to/from memory locations in other storage devices, storage controllers (e.g. SVC 110), or servers (e.g. host 102).

In some embodiments, XOR module 314 may be a hardware, software, or combined hardware/software engine for providing exclusive-or calculations or implementing another erasure coding operation. XOR module 314 may support multiple functions stored in memory 320 and/or support XOR or other erasure code processing of data being transferred to or from buffers 306, with or without RDMA interface 304, and/or FTL memory 312.

Additional modules (not shown) supporting one or more functions of storage device 120 may be connected to CPU 302, RDMA interface 304, NVM interface 308, XOR module 314, FTL memory 312, and memory 320. As an example, additional module(s) may include an error control module to limit the number of uncorrectable errors inadvertently introduced into data during writes to memory and/or reads from memory, such as an error correction code (ECC) encoder and decoder. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, SVC 110 receives a host write command (e.g., in a set of one or more host write commands) via interface 112 (FIG. 1), translates that host write command into a write command, sometimes called a translated command or translated write command, suitable for execution by a data storage device 120, and sends the translated command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its NVM devices 140.1.1-140.1.n, or a portion of the data to be stored, from the storage controller via the interconnect fabric 114. The data received by the storage device may be encoded or otherwise processed and made available to storage NVM interface 308, which transfers the data to NVM devices 140.1 in a manner dependent on the type of storage medium being utilized. In storage device 120, RDMA interface 304 and buffers 306, in conjunction with coordination from SVC 110, may allow host 102 to send the data to be stored in the host write command to buffers 306 in storage device 120 without them passing through SVC 110 or another storage controller.

In some embodiments, a read operation is initiated when host 102 sends a host read command (e.g., in a set of one or more host read commands), to SVC 110, which translates the received host read command into a read command (e.g., into a lower level data storage device command, sometimes herein called a translated command or translated read command, suitable for execution by a data storage device 120) and sends the translated read command to a destination data storage device 120, requesting data from that data storage device's storage medium (e.g., one or more NVM devices 140.1). CPU 302 may send one or more read access commands to NVM devices 140.1, via NVM interface 308, in accordance with memory locations (addresses) specified by the host read command.

NVM interface 308 may provide the raw read data (e.g., comprising one or more codewords) for decoding or other processing. The read access commands correspond to the received read command, but the read command is converted by storage device 120 into read access commands, for example so as to be directed to one or more specific NVM device from NVM devices 140.1. In some embodiments, if the read is not successful, storage device 120 may resort to a number of remedial actions or provide an indication of an irresolvable error condition.

In some storage systems, the read data from storage device 120 is provided to a storage controller to make it available to host 102. In storage device 120, RDMA interface 304 and buffers 306, in conjunction with coordination from SVC 110, may allow host 102 to receive the data to be read in the host read command from buffers 306 in storage device 120 without them passing through SVC 110 or another storage controller.

As explained above, a storage medium (e.g., NVM devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells (SLCs) or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage medium or media (i.e., TLC, MLC, or SLC and/or a chosen data redundancy mechanism or ECC code) is a choice made when data is actually written to the storage medium or media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

FIG. 3 is a block diagram illustrating distributed read/write operations handled by storage device 120, in accordance with some embodiments. Storage device 120 includes CPU 302 for executing modules, programs, and/or instructions stored in memory 320 and thereby performing processing operations, memory 320 (sometimes called NVM controller memory), and one or more communication buses 300 for interconnecting these components.

The one or more communication buses 300 optionally include circuitry (sometimes called a chipset) that interconnects and controls communications between system components. CPU 302 and memory 320 may be coupled to RDMA interface 304, buffers 306, NVM interface 308, NVM devices 140.1, XOR module 314, FTL memory 312, and any additional module(s) by the one or more communication buses 300. In some embodiments, interface hardware and/or protocols for providing communication through communication buses 300 may also be present for communication with any given component. For example, FTL memory 312 may be provided in RAM external to an FPGA, ASIC, or other architecture integrating CPU 302, memory 320, and other components in FIG. 3 and a RAM interface (not shown) may be provided for CPU 302 to transfer data to and from FTL memory 312.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as FTL memory 312 for flash translation layer (FTL) data, and/or buffers 306. These functional memories may include specialized processing, hardware acceleration, and/or other resources related to their function. In some embodiments, one or more of FTL memory 312 and/or buffers 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

- host FTL services 322 for managing host FTL data (including logical address mapping) and related processes and requests, such as host FTL lookup requests from a host, storage controller, or another storage device (e.g., host 102, SVC 110, or storage devices 120);
- NVM manager 324 for managing storage device FTL data (including logical address mapping) and related processes and requests, such as media read and write operations through NVM interface 308 to NVM 140.1.1-140.1.n;
- buffer access module 326 for monitoring contents and access to buffers 306, sometimes referred to as persistent memory buffers or controller memory buffers, by storage device 120, as well as hosts, storage controllers, and peer storage devices (e.g., host 102, SVC 110, or storage devices 120);
- distributed read module 328 for executing read operations as a destination storage device, in conjunction with NVM manager 324 and buffer access module 326;
- distributed write module 330 for executing write operations as a destination storage device, in conjunction with NVM manager 324 and buffer access module 326; and
- distributed parity module 332 for executing parity writes and related processes for calculating parity and related host FTL updates, in conjunction with XOR module 314, NVM manager 324, and buffer access module 326.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

In some embodiments, host FTL services 322 may include portions of FTL services that may have otherwise been executed at the storage controller or host, such as access to and maintenance of host FTL logical map 312.1 stored in FTL memory 312. For example, host FTL logical map 312.1 may include a portion of a complete logical map for all storage devices in data storage system 100. In some embodiments, the complete logical map is allocated in portions distributed across storage devices 120 in approximately equal portions. The host FTL logical map 312.1 on any given storage device 120 may or may not include storage locations on that storage device 120. In some embodiments, portions of the complete logical map may be allocated randomly, sequentially in a round robin fashion, or according to a more determined allocation scheme to support data protection, performance, or capacity utilization standards of service. In some embodiments, each portion of the complete logical map is redundantly stored across two or more storage devices in case of storage device failure.

In some embodiments, host FTL logical map 312.1 may be hosted in a dedicated portion of FTL memory 312. For example, FTL memory 312 may be DRAM with a portion dedicated to storage device FTL map 312.2 and the remainder dedicated to host FTL logical map 312.1. Host FTL logical map 312.1 may be used for holding segments of mapping information between Host logical block addresses (LBA) and storage device LBA or media storage locations. In some embodiments, the complete logical map for all host LBAs in data storage system 100 may be contained in a host FTL table and host FTL logical map 312.1 in any given storage device 120 may be a mathematically determined portion of the host FTL table to enable a host FTL lookup request to be addressed to the correct target service host storage device. For example, host FTL services 322 in storage device 120 may be responsible for host LBAs 1-1000, regardless of which of storage devices 120.1-120.n host the actual data on their media, and host FTL lookup requests for those LBAs will be addressed to host FTL services 322.

In some embodiments, host FTL logical map 312.1 may be allocated and/or organized by host LBA storage locations corresponding to a host write size, such as 4K data blocks. Storage device FTL map 312.2 may be allocated and/or organized by media LBA storage locations corresponding to a media write size that is a larger multiple of the host write size. For example, the media write size may be set to a page size, such as a multiplane page size of 96K or 192K. By increasing the media write granularity, storage device FTL map 312.2 may use less of FTL memory 312. For example, storage device FTL map 312.2 may use less than 5% of FTL memory 312 relative to the remaining memory space available for host FTL logical map 312.1. In some embodiments, this may enable storage devices that are switchable between conventional host data block mapping (e.g. 4K host writes to storage media locations) and offloaded host FTL with reduced memory for storage device FTL at higher media write granularity (e.g. 96K or 192K media writes) without changing FTL memory 312 hardware.

Host FTL services 322 may include a number of services or functions for supporting distributed read/write and drive-to-drive communications. Host FTL services 322 may include host FTL lookup 322.1 for looking up mapping information to translate host LBA to media storage locations or vice versa. For example, host FTL services 322 may receive a host FTL lookup request indicating one or more host LBAs, lookup the corresponding entries in host FTL logical map 312.1, and return mapping information corresponding to the media storage locations on the respective storage devices. The returned mapping information may include both one or more storage device identifiers and corresponding storage device LBA or media storage location identifiers for use by other centralized (SVC 110 or host 102) or distributed (other storage devices) functions, such as read/write, garbage collection, parity calculation, RAID striping, data recovery, data or FTL map rebuilding, etc.

Host FTL services 322 may include host FTL updater 322.2 for updating the portion of the host FTL logical map 312.1 in FTL memory 312. Host FTL services 322 may receive a host FTL update request specifying one or more host LBAs and the new mapping information for the corresponding storage device identification and media storage locations. In some embodiments, host FTL updater 322.2 writes the new mapping information to host FTL logical map 312.1.

In embodiments using redundant host FTL mapping, host FTL updater 322.2 may also send the new mapping information to the corresponding portion of host FTL logical map in another storage device. For example, host FTL updater 322.2 may write the new mapping information be sending an update request to the host FTL updater of another storage device. In some embodiments, host FTL updater 322.2 may also log the changes in buffer 306 and/or corresponding buffers in the redundant storage device. Host FTL updater 322.2 may send an update complete message to the requester.

In some embodiments, the update request will include updating both host FTL mapping information for the destination storage device and for a parity storage device. Host FTL updater 322.2 may receive a host FTL update command with host LBA, mapping information, and parity storage device identifier. Host FTL updater 322.2 may look up the stored mapping information in FTL logical map 312.1 and XOR the stored mapping information with received mapping information, then send a host FTL XOR update command to the host FTL services of the parity storage device. In some embodiments, host FTL updater 322.2 may receive status or other notification that the host FTL XOR update command is complete and update the local host FTL logical map 312.1 with the new mapping information. In some embodiments, host FTL updater may log the change to the host FTL entry in host FTL logical map 312.1 in a log in buffers 306.

In some embodiments, storage device 120 also acts as a parity storage device and host FTL services 322 may include parity host FTL updater 322.3. Parity host updater 322.2 may receive a host FTL XOR update command from the host FTL services of another storage device, such as the storage device maintaining the relevant portion of host FTL logical map 312.1. Parity host FTL updater 322.3 may issue commands to access the local data identified in the request, XOR that data with the contents of a XOR buffer identified in the request, and write the resulting data into the same XOR buffer.

In some embodiments, parity host FTL updater 322.3 may process a similar operation on the mapping information in the request: retrieve the corresponding mapping information (host FTL entry corresponding to parity LBA); XOR the mapping information in the request with the retrieved mapping information; and store the results back in (local) host FTL logical map 312.1. In some embodiments, parity host FTL updater 322.3 may log the change to the host FTL entry in host FTL logical map 312.1 in a log in buffers 306. Parity host FTL updater 322.2 may send a status back to host FTL services 322 of the storage device that sent the request.

In some embodiments, NVM manager 324 includes base FTL services for storage device 120 and manages storage device FTL map 312.2. In some embodiments, storage device FTL map 312.2 provides a base level of FTL mapping for storage device 120. Storage device FTL map 312.2 may include allocation of storage locations with a defined size based on compatibility of with storage units in NVM devices 140.1, such as page size, and the same defined storage unit sizes may be used for buffers 306. For example, storage locations may be allocated as 4 KB or 8 KB pages. In some embodiments, allocation sizes for storage locations may correspond to larger multiplane NVM page sizes, such as 96 KB or 192 KB.

Storage device FTL map 312.2 may enable NVM-level management of storage locations. For example, NVM manager 324 may use storage device FTL map 312.2 for bad block management, bad block spare overprovisioning, and allocation of gap free logical space throughout the life of the NVM. In some embodiments, NVM manager 324 may also include error correction (e.g., low-density parity-check (LDPC) or Bose-Chaudhuri-Hocquenghem (BCH) codes) and tuning of NVM access parameter (e.g., read levels, programming thresholds, etc.). NVM manager 324 may enable reads from LBA storage locations in NVM devices 140.1 to write in buffers 306 and reads from buffers 306 to writes in LBA storage locations in NVM devices 140.1. In some embodiments, NVM manager 324 does not manage any RAID-related redundancy or striping across the NVM under its management and RAID groups and striping may be managed across the storage devices in a distributed fashion.

In some embodiments, buffer access module 326 operates in conjunction with RDMA interface 304 to manage local and remote use of buffers 306. For example, local operations by NVM manager 324 may include writes and reads to buffers 306, read/write operations may include coordinates use of space in buffers 306 for both local and remote access, and other distributed operations may use space in buffers 306 as requested by SVC 110 or other storage devices. In some embodiments, buffer access module 326 may implement one or more buffer-related services for host FTL services 322. For example, buffer access module 326 may allocate buffer space for receiving host data, data from another storage device, or other data related to distributed FTL services.

In some embodiments, buffer access module 326 is subordinate to buffer allocations by a remote buffer manager, such as device buffer manager 216 in SVC 110. For example, buffer access module 326 may receive and log buffer allocations by device buffer manager 216 and/or request buffer allocations from device buffer manager 216 for local use. In some embodiments, buffer access module 326 may also process a buffer flush command received from a remote buffer manager. For example, the buffer flush command may cause NVM manager 324 to write the contents of buffers 306 to NVM devices 140.1 and buffer access module 326 to clear the contents of buffers 306 for reuse. In some embodiments, buffer access module 326 may provide status back to a remote buffer manager when the buffer flush command is complete.

In some embodiments, distributed read module 328 completes local read operations when storage device 120 includes the destination storage location of a host read command or other read command. Distributed read module 328 may receive a read command at read command handler 328.1. SVC 110 may initiate the read command. The read command may be addressed to storage device 120 based on a prior FTL lookup that identified the destination storage device for the read command. The read command may include the LBA range for the read and a destination buffer location in buffers 306.

Distributed read module 328 may then initiate a media read operation 328.2. For example, media read operation 328.2 may include instructions to NVM manager 324 to execute a read from a storage location on NVM devices 140.1 corresponding to the LBA range in the read request, based on the storage device FTL map 312.2 in FTL memory 312. The instruction may also indicate an allocated buffer location in buffers 306 for NVM manager 324 to write the data to. In some embodiments, media read operation 328.2 may also use buffer access module 326 to log the buffer allocation, make the buffer space available to NVM manager 324 for writing the read data, and/or ready RDMA interface 304 for the host data transfer from buffers 306 that may follow.

In some embodiments, when the data is read from NVM devices 140.1 and ready in buffers 306, distributed read module 328 may send a read complete status 328.3 to the requesting system. The requesting system may then be able to continue host read operations based on the data available in the allocated buffer space in buffers 306. In some embodiments, distributed read module 328 may initiate a push transfer of data from buffers 306 using RDMA interface 304. In other embodiments, SVC 110, host 102, or an RDMA engine elsewhere in data storage system 100 may initiate the data transfer to host 102.

In some embodiments, distributed write module 330 completes local write operations when storage device 120 includes the destination storage location of a host write command or other write command. Distributed write module 330 may receive a write command at write command handler 330.1. SVC 110 may initiate the write command. The write command may be addressed to storage device 120 based on a prior FTL lookup that identified the destination storage device for the write command. The write command may include a destination buffer location in buffers 306 for the host data transfer and LBA for the destination storage location.

Distributed write module 330 may use buffer access module 326 to allocate the buffer location in buffers 306 to receive the host data. RDMA interface 304 may be readied for the host data transfer. In some embodiments, distributed write module 330 may also use buffer access module 326 to log the buffer allocation and make the buffer space available to NVM manager 324 for reading the data to be written.

Distributed write module 330 may then initiate a media write operation 330.2. For example, media read operation 328.2 may include instructions to NVM manager 324 to execute a read from the allocated buffer space in buffers 306 for the host data and a write to a storage location on NVM devices 140.1 corresponding to the LBA range in the write request, based on the storage device FTL map 312.2 in FTL memory 312. NVM manager 324 may also update storage device FTL map 312.2 to reflect the newly written data. In some embodiments, when the data is read from buffers 306 and written to NVM devices 140.1, distributed write module 330 may send a write complete status 330.3 to the requesting system. The requesting system may then be able to continue host write operations, which may include updates of host FTL and any parity operations.

In some embodiments, distributed parity module 332 supports local parity calculation, storage, and related host FTL mapping information updates initiated by parity host FTL updater 322.3. Buffer-to-buffer transfer 332.1 may allow the parity storage device to pull data from the buffer of the destination storage device for a write request and write it to local buffers 306. For example, buffer-to-buffer transfer 332.1 in the parity storage device may use an RDMA command to access a buffer in the other storage device as identified by parity host FTL updater 322.2. Buffer-to-buffer transfer 332.1 may allocate a XOR buffer using buffer access module 326 and/or as identified by a remote buffer manager. Buffer-to-buffer transfer 332.1 may transfer the host write data in the buffers of write data storage device to the XOR buffer.

Parity device XOR 332.2 may read local parity stripe data from NVM devices 140.1 using NVM manager 324, use XOR module 314 to XOR the contents of the XOR buffer with the local parity stripe data, and write the resulting data back to the XOR buffer. The contents of the XOR buffer may then be written to NVM devices 140.1 for parity storage. In some embodiments, the contents of the XOR buffer may be written to NVM devices 140.1 when a separate command is received from a remote buffer manager, such as SVC 110.

For example, XOR buffer may be allowed to accumulate a full stripe of information and then receive a buffer flush command to write the full parity stripe data to NVM devices 140.1.

Figure 4:
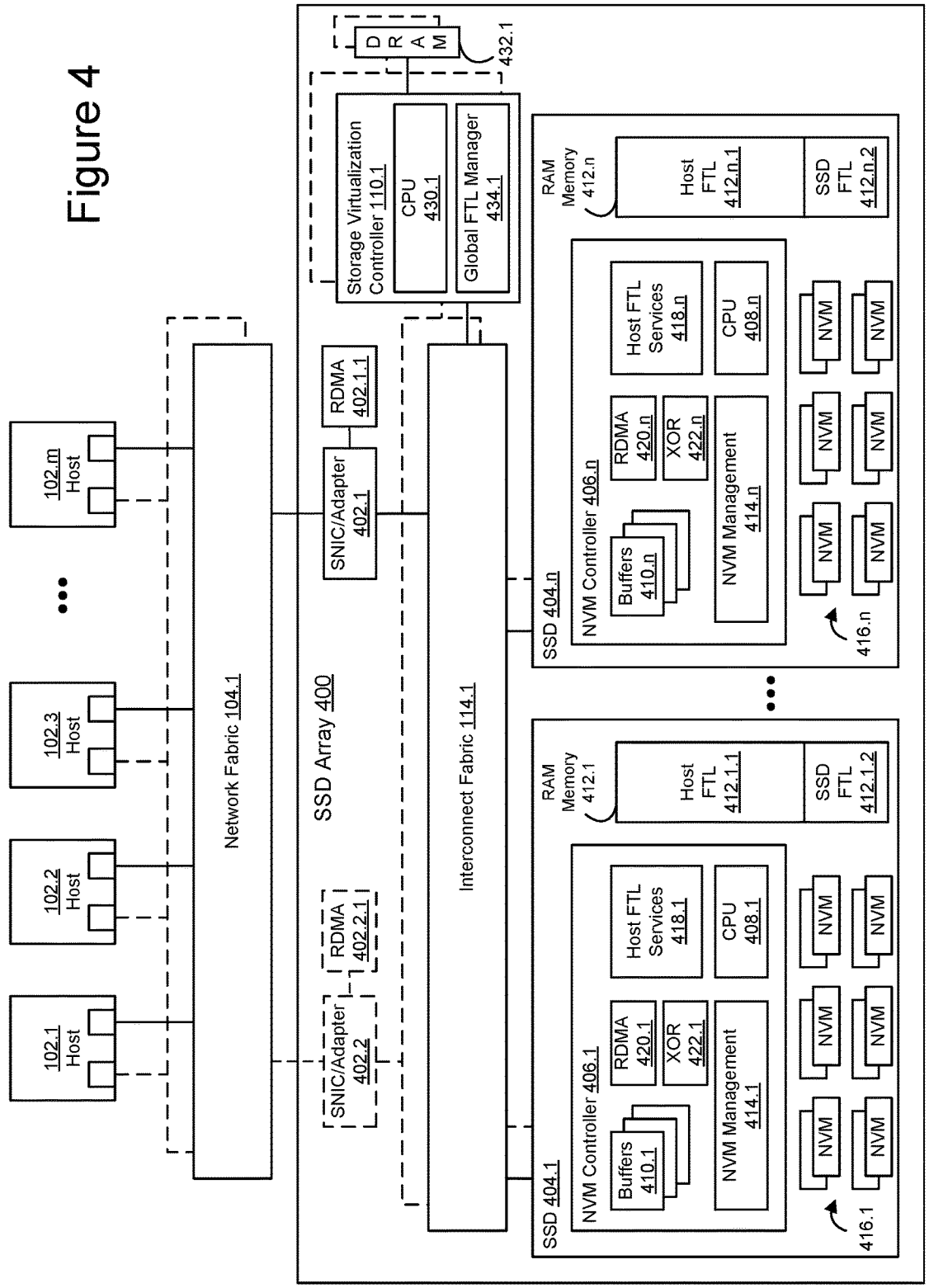
FIG. 4 schematically illustrates an example of a disaggregated storage architecture, including example configurations of the multi-device storage system of FIG. 1.

FIG. 4 illustrates an example implementation of a multi-device storage architecture with distributed read/write processing as may be used in a disaggregated storage system, in accordance with some embodiments. SSD array 400 may be a High Availability (HA) Redundant Array of Independent Disks (RAID) Bunch of Flash (BOF). As the name indicates, this example shows a bunch of flash drives, SSDs 404, in a Redundant Coding (RC) configuration, connected via an interconnect fabric 114 to facilitate high availability.

In some embodiments, one or more adapters or Storage Network Interface Cards (SNICs) 402 connect SSD array 400 to one or more hosts 102 via one or more network fabrics 104 and may include RDMA engine 402.1.1 for transferring data between components connected to interconnect fabrics 114 and network fabrics 104. The example shows one or more Storage Virtualization Controllers (SVCs) 110 connected to one or more backend Solid Storage Devices (SSDs, 404.1 through 404.n) and one or more network fabrics 104 (for e.g., Ethernet, Infiniband, peripheral component interconnect express (PCIe)) through one or more interconnect fabrics 114. In some embodiments, interconnect fabric 114 is PCIe or a similar fabric. In some embodiments, SVCs 110 are a part of the SNIC/Adapters 402 and/or interconnect fabric 114.

Storage virtualization controller 110.1 may be a separate system-on-a-chip (SOC), ASIC, FPGA, or similar component with its own CPU 430.1 and DRAM 432.1 executing a global FTL manager 434.1 to coordinate read/write requests from hosts 102.1-102.m. Furthermore, in some embodiments, each SVC 110 contains an inexpensive CPU 430 to perform initialization, management and other similar slow path activities, and fast path automation hardware, which completely handles fast path commands processing (e.g., data transfers between hosts 102 and backend SSDs 404), so that CPU 430 has little or no involvement in the processing of fast path commands (e.g., no involvement other than initializing or setting up SNIC/Adapters 402 (including RDMA engine 402.1.1), buffers 410, and RDMAs 420 to handle the operations).

In some embodiments, each SSD 404 is configured to support offloaded or distributed operations, as discussed in more detail below. Each SSD 404 has internal buffer memory organized as one or more buffers 410. In some embodiments, SSDs 404 support peer-to-peer communications between the SSDs, so that the SSDs 404 can transfer data between themselves, such as for performing parity calculation to a parity SSD with assistance from XOR modules 422, without external control. Each SSD 404 also has an NVM management module 414 that manages one or more non-volatile memory devices (NVMs) 416 and performs various flash management operations for the respective SSDs. The Host FTL services module 418 works in conjunction, or co-ordinates, with NVM management module 414 to implement various distributed operations, such as distributed read/write operations.

In some embodiments, one or more modules in NVM controller 406 perform offloaded services, offloaded from the one or more SVCs 110. Such services include global flash translation layer (FTL) addressing operations, parity computations (e.g., XOR, Reed-Solomon), Garbage Collection (GC) related functions, GC data transfers (via peer-to-peer communication), and other operations that are typically performed in the SVCs. Also, in some embodiments, operations that are delayed (e.g., part of stripe closing or garbage collection, to be executed in the future) are offloaded to the SSDs along with operations that require more immediate attention. With the support provided by peer SSDs, the SSDs 404 handle the offloaded operations in response to host commands and/or intermediate commands from SVC 110, in accordance with some embodiments.

An example SSD 404.1 may also include RAM memory 412.1 for storing both SSD FTL mapping 412.1.2 and a portion of host FTL mapping 412.1.1. Some SSDs have sufficient hardware and computational resources to support offloaded services, and only firmware changes are needed to implement the SSD portion of some of the embodiments described herein. The system architecture shown in FIG. 4 enables low cost disaggregated storage with nearly the same performance as backend SSDs, while supporting offloaded services, such as global FTL addressing, Line Speed Offloaded Coding (LSOC), write transactions, remapping, scale out, and Xcopy. The offloading of such services from hosts 102 using a storage system using the storage system architecture of FIG. 4 can lead to operational savings.

Additionally, as shown in FIG. 4, various portions of the communication fabric between hosts 102 and SSDs 404 may be provided in single (solid line) or redundant (dotted line) configurations. For example, redundant network fabric 104, SNIC/Adapter 402, interconnect fabric 114, and SVC 110 may be provided for additional failover protection. The redundant communication paths and SVCs may be less desirable in embodiments implementing distributed read/write operations as described herein, which may reduce the impact of power interruptions through structured use of persistent memories, drive-to-drive communications, and event logging.

Figure 5:
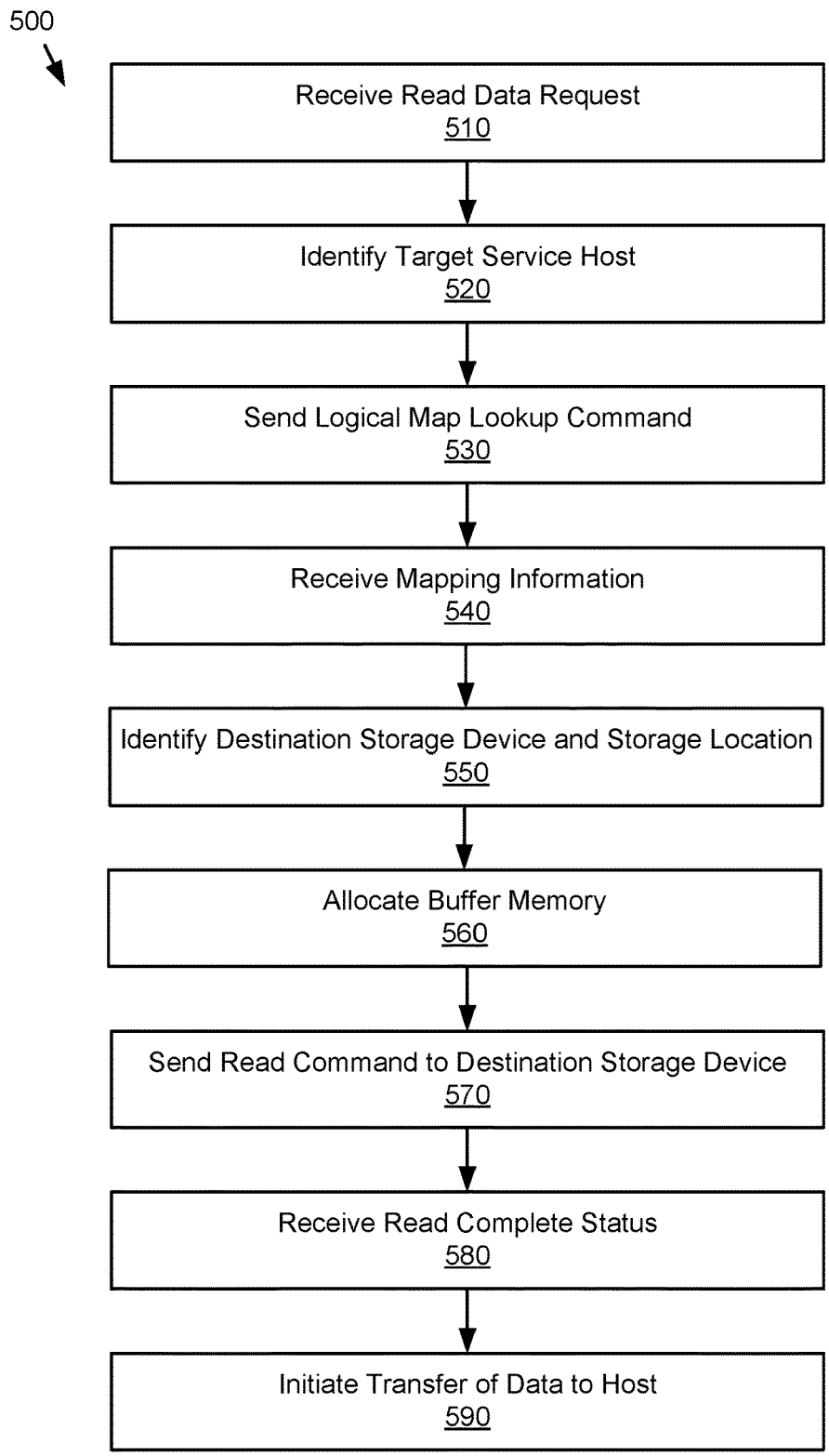
FIG. 5 illustrates an example of a method for distributed read operations using a storage virtualization controller.

As shown in FIG. 5, the data storage system 100 may be operated according to a distributed read operation for identifying mapping information from a target service host storage device, allocating buffer memory for the storage device to host transfer, and coordinating the data read from the destination storage device and the host. For example, a storage virtualization controller (e.g. SVC 110) may execute one or more steps in communication with a host (e.g. host 102), one or more storage devices (e.g. storage devices 120), and one or more data transfer engines (e.g. RDMA engines 420, 402.1.1) according to the method 500 illustrated by blocks 510-590 of FIG. 5.

At block 510, a read data request may be received by the data storage system. For example, when a host, server, or other network system using the data storage system for data storage needs to read data from the storage array, it may send a host read data request to the storage system through a network interface. The read data request may be routed within the storage system to a request handling module, such as a request handling module in an SVC or other storage system component.

At block 520, a target service host storage device is identified. For example, the host LBA range may be used in a function or table lookup to identify the portion (or portions) of the logical map in which the LBA mapping information is stored. A storage device ID for the target service host storage device may be returned.

At block 530, a logical map lookup command may be sent to the storage device (or storage devices) identified in block 520. For example, based on the storage device ID and the host LBA range in the host read data request, the logical map lookup command may be addressed to the storage device containing the relevant portion of the logical map with the host LBA range as an argument for looking up the mapping information.

At block 540, a response from the logical map lookup command including the host-to-storage device mapping information may be received. For example, the target service host storage device may have processed the logical map lookup command and returned the response.

At block 550, a destination storage device and a storage location for the read command may be identified. For example, the mapping information received from the target service host storage device may include a storage device ID, LBA range, and other FTL mapping information and the relevant information may be extracted from the response.

At block 560, buffer memory may be allocated in the data storage system for buffering the read data as it is read from the medium or media in the destination storage device. For example, a portion of buffer memory in the destination storage device may be allocated for the read data, the buffer location addressable over the interconnect fabric of the storage system using a direct memory access protocol, such as RDMA.

At block 570, a read command may be sent to the destination storage device. For example, the device read command may be addressed based on the storage device ID and identify the LBA range to be read and the buffer location to which it should be transferred.

At block 580, a read complete status may be received from the destination storage device. For example, when the destination storage device has successfully read the corresponding storage device LBAs from the storage medium or media and written the corresponding data to the identified buffer location.

At block 590, a host data transfer from the buffer memory to a host memory location may be initiated. For example, a direct memory access protocol, such as RDMA, may be initiated in a data transfer engine to push the data from the memory buffer to the host memory location, pull the data from the memory buffer to the host memory location, or otherwise transfer it through the interconnect and network fabrics between the storage devices and the host. In some embodiments, an RDMA engine in the fabrics or interfaces, such as a network interface card, may receive the host data transfer command and execute the transfer from an RDMA interface in the storage device to an RDMA interface in the host via their respective fabrics.

Figure 6:
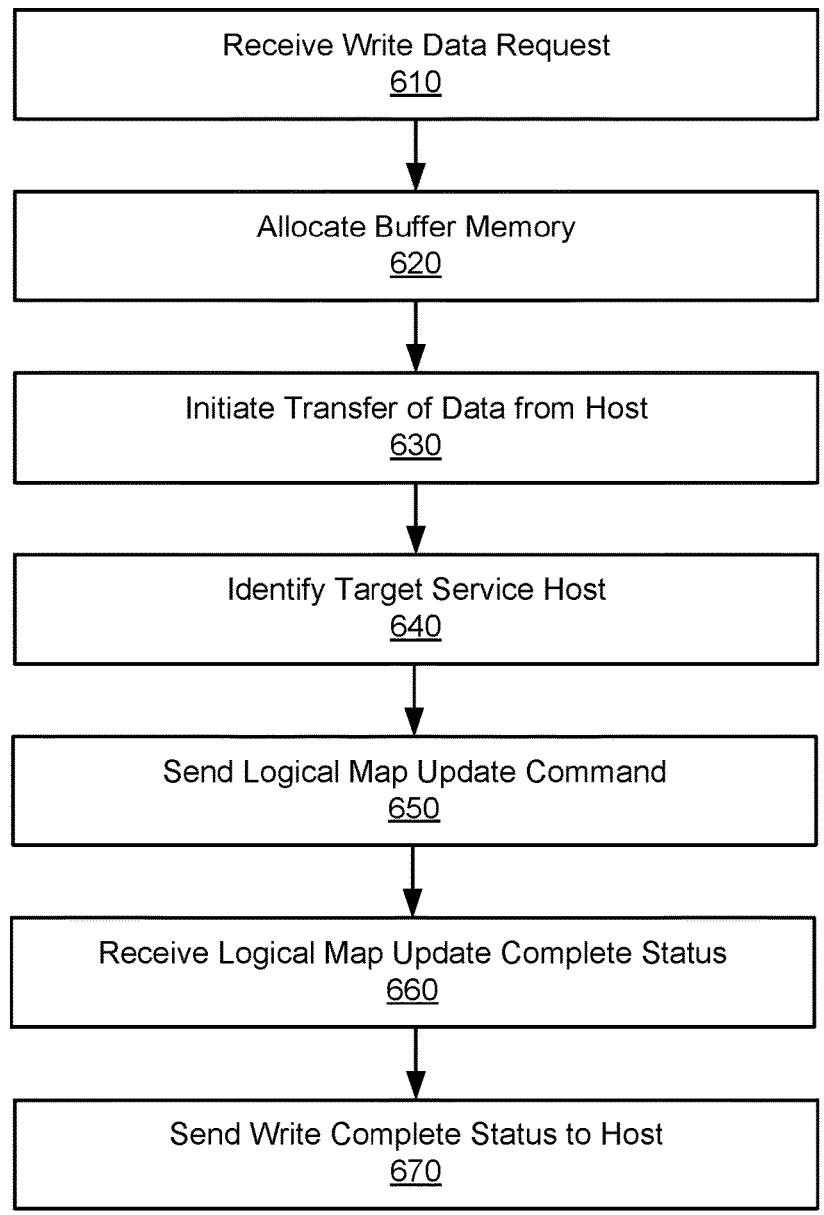
FIG. 6 illustrates an example of a method for distributed write operations using a storage virtualization controller.

As shown in FIG. 6, the data storage system 100 may be operated according to a distributed write operation for allocating buffer memory for the host to storage device transfer, identifying mapping information on a target service host storage device that needs updating, and coordinating the data write from the host and the destination storage device. For example, a storage virtualization controller (e.g. SVC 110) may execute one or more steps in communication with a host (e.g. host 102), one or more storage devices (e.g. storage devices 120), and one or more data transfer engines (e.g. RDMA engines 420, 402.1.1) according to the method 600 illustrated by blocks 510-590 of FIG. 6.

At block 610, a write data request may be received by the data storage system. For example, when a host, server, or other network system using the data storage system for data storage needs to write data to the storage array, it may send a host write data request to the storage system through a network interface. The write data request may be routed within the storage system to a request handling module, such as a request handling module in an SVC or other storage system component.

At block 620, buffer memory may be allocated in the data storage system for buffering the write data from the host before it is written to the medium or media in the destination storage device. For example, a portion of buffer memory in the destination storage device may be allocated for the write data, the buffer location addressable over the interconnect fabric of the storage system using a direct memory access protocol, such as RDMA. In some embodiments, the SVC may include logic for allocating new write requests among the storage devices, including write and/or buffer serialization logic, using a function or table of storage device IDs. In some embodiments, the buffer allocation may be communicated to the destination storage device based on the storage ID for the write.

At block 630, a host data transfer from the host memory to the allocated buffer memory location may be initiated. For example, a direct memory access protocol, such as RDMA, may be initiated in a data transfer engine to push the data from the host memory location to the buffer memory, pull the data from the host memory location to the buffer memory, or otherwise transfer it through the interconnect and network fabrics between the storage devices and the host. In some embodiments, an RDMA engine in the fabrics or interfaces, such as a network interface card, may receive the host data transfer command and execute the transfer from an RDMA interface in the storage device to an RDMA interface in the host via their respective fabrics.

At block 640, a target service host storage device may be identified. For example, the host LBA range may be used in a function or table lookup to identify the portion (or portions) of the logical map in which the LBA mapping information is stored. A storage device ID for the target service host storage device may be returned.

At block 650, a logical map update command may be sent to the storage device (or storage devices) identified in block 640. For example, based on the storage device ID of the target service host storage device, the host LBA range in the host write data request, and the destination storage device in which the buffer memory was allocated, the logical map update command may be addressed to the storage device containing the relevant portion of the logical map with the host LBA range and destination storage device ID as arguments for accessing and updating the mapping information. In some embodiments, the target service host storage device, the destination storage device, and/or a RAID-related function may initiate the data transfer from the allocated buffer memory to the storage medium or media in the destination storage device (and/or parity storage device). In some embodiments, additional arguments related to parity storage devices and/or RAID striping may also be included. For example, the target host storage device may include host FTL services for coordinating parity writes and mapping information updates using drive-to-drive communication in the storage array.

At block 660, a response from the logical map update command may be received to communicate that data has been received by the storage devices and logical map information has been updated. For example, the target service host storage device may have calculated and logged the changes in logical mapping based on the new writes (and related parity writes) and returned the status response.

At block 670, a write complete status is sent to the host. For example, when the target service host storage device (or devices) has successfully updated the corresponding host LBAs and all data has been written to storage device buffers.

Write complete status may or may not reflect completion of data write from storage device buffers to storage medium or media.

Figure 7:
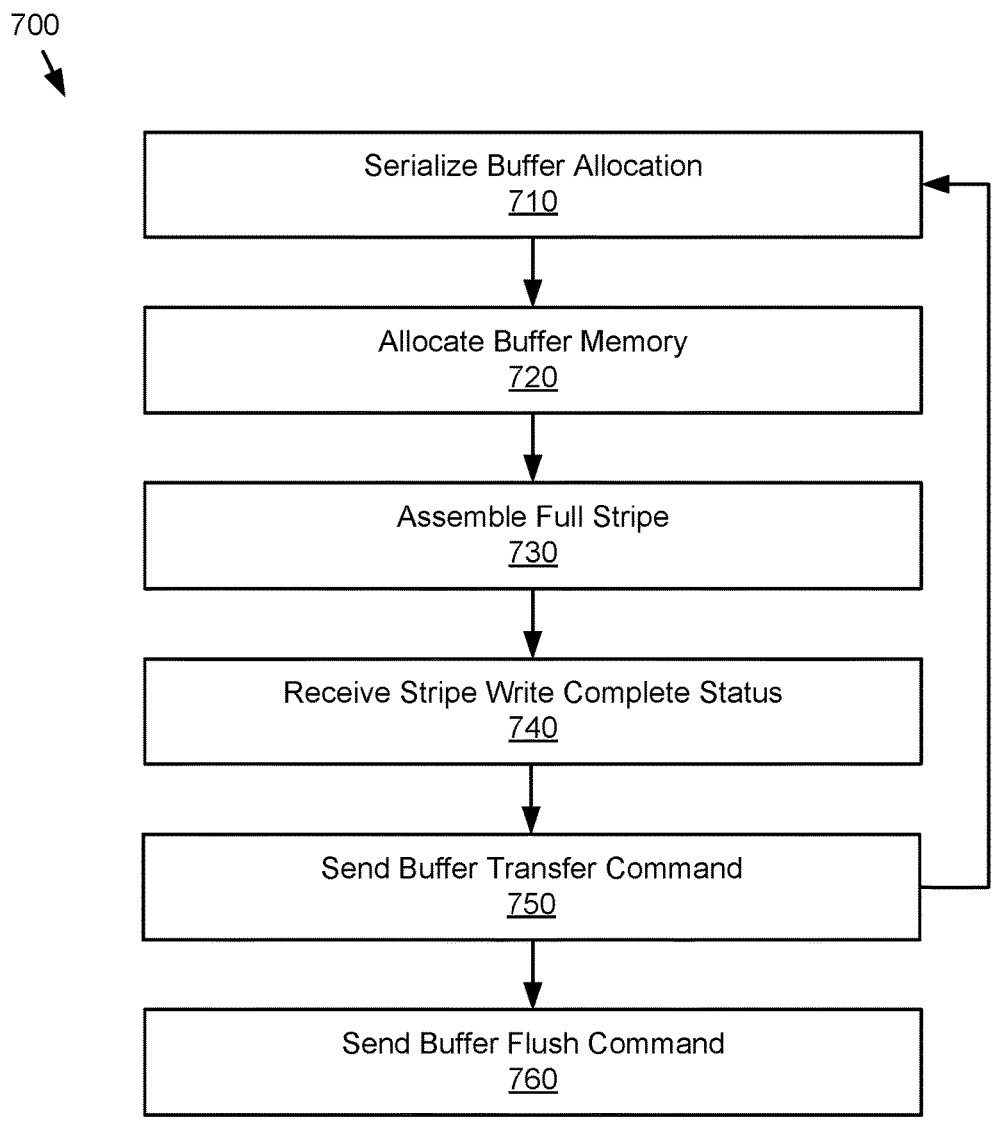
FIG. 7 illustrates an example of a method for distributed read/write operations using a buffer manager.

As shown in FIG. 7, the data storage system 100 may be operated according to a buffer management operation to support distributed read/write operations and/or other distributed or drive-to-drive services. For example, a storage virtualization controller (e.g. SVC 110) may include a buffer manager and execute one or more steps in communication with a host (e.g. host 102), one or more storage devices (e.g. storage devices 120), and one or more data transfer engines (e.g. RDMA engines 420, 402.1.1) according to the method 700 illustrated by blocks 710-760 of FIG. 7.

At block 710, buffer allocations may be serialized. For example, when a host write command is being executed, the buffer manager may determine the order in which writes should be allocated across the buffers of the storage devices in the array. Buffer allocations may also be serialized for other operations, such as garbage collection, rebuilds, or other activities where storage, I/O, and/or processing efficiencies may be gained from ordering buffer usage. In some embodiments, buffer allocations may be serialized to support RAID striping.

At block 720, buffer memory may be allocated in the data storage system. For example, a portion of buffer memory in one or more storage devices may be allocated for read data, write data, parity/XOR data, log data, or other memory allocations for read/write operations or other distributed services. The buffer locations may be addressable over the interconnect fabric of the storage system using a direct memory access protocol, such as RDMA. In some embodiments, the buffer allocation may be communicated to the storage devices containing the buffer location and/or storage devices or other components accessing the buffer location.

At block 730, buffer spaces may be serialized and allocated to assemble a full RAID stripe. For example, write commands corresponding to host writes of a selected RAID stripe depth may be sequentially assigned to a plurality of storage devices in the array participating in a RAID group and the buffer manager may track when a full stripe of write data has been allocated to the storage devices.

At block 740, a RAID stripe write complete status is received. For example, a RAID striping module may track aggregate write complete status messages from the storage devices and send buffer manager a RAID stripe write complete status when all status messages for the strip are received. In some embodiments, the buffer manager may receive write complete status messages directly from the storage devices to track RAID strip write complete status.

At block 750, a buffer transfer command may be sent to a storage device to transfer data in a buffer location to the storage medium or media of the storage device. For example, the buffer manager may send a buffer transfer command to each storage device involved in a RAID stripe when the RAID stripe write complete status is received. In some embodiments, writes may be completed by sending a buffer transfer command to a storage device identifying the storage device and the buffer location without regard to the completion of a RAID stripe. In some embodiments, the buffer transfer command may not be sent until the buffer capacity or some predefined portion thereof is full. The buffer transfer command may or may not clear the buffer and enable it for allocation to another use. After the buffer transfer command is sent, operation may return to block 710 for the serialization of additional writes related to a pending or newly received host write command.

In block 760, a buffer flush command may be sent to one or more storage devices. For example, the buffer flush command may cause the receiving storage device to write all data in its data buffers or a specified portion of its data buffers to the storage device's storage medium or media and clear the affected data buffers for future use. In some embodiments, the buffer flush command may be issued after a full RAID stripe has been written to the buffers of multiple storage devices and LBA mapping information has been updated and it may cause all affected storage devices to write the relevant buffers to storage medium or media and free them for reuse.

Figure 8:
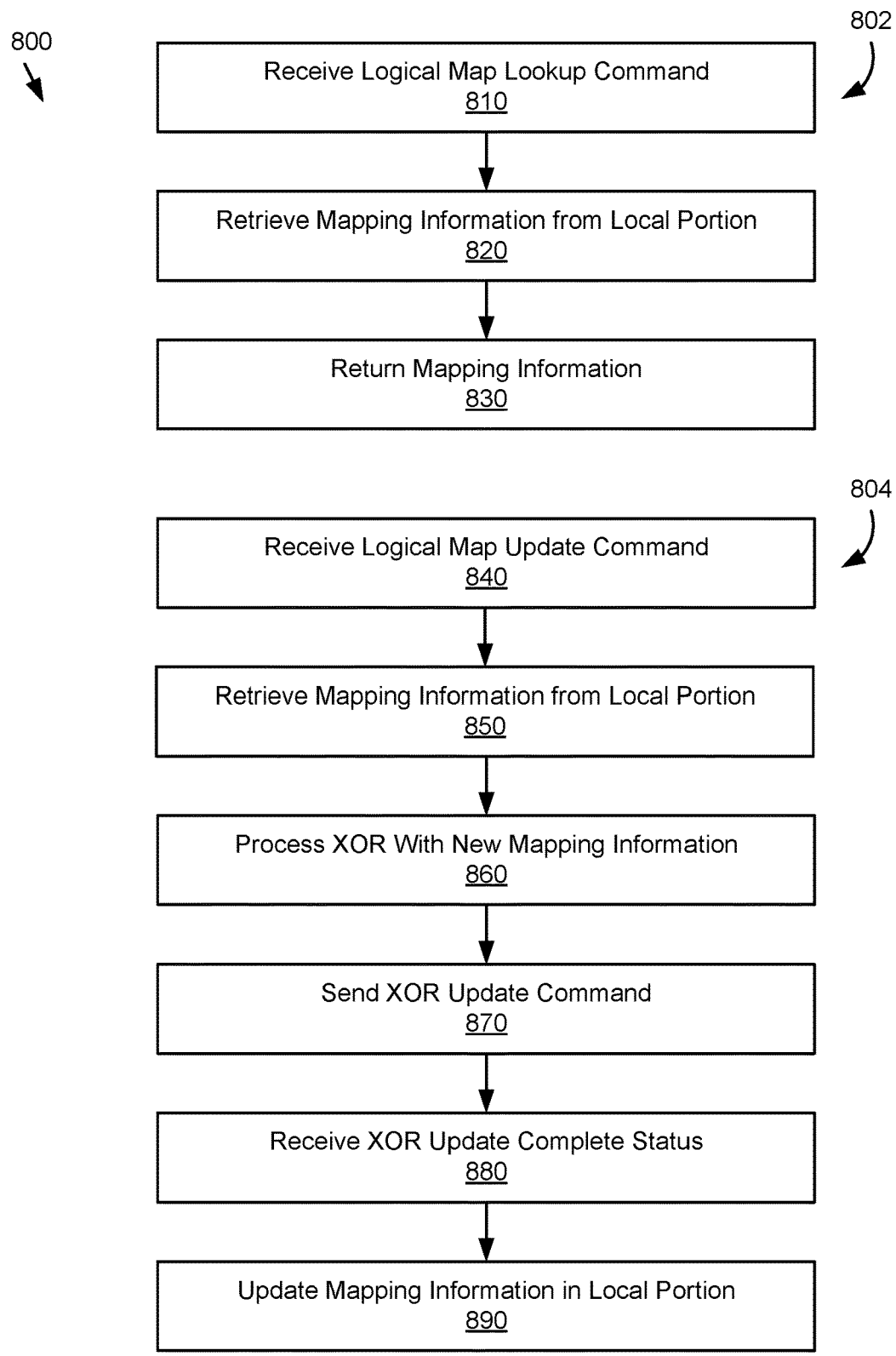
FIG. 8 illustrates an example of a method for distributed read/write operations using a service host storage device.

As shown in FIG. 8, the data storage system 100 may be operated according to distributed host FTL service operations to support distributed read/write operations and/or other distributed or drive-to-drive services. For example, one or more storage devices (e.g. storage devices 120) may include a host FTL services module (e.g. host FTL services 322) and execute one or more steps in communication with a storage virtualization controller (e.g. SVC 110), one or more other storage devices (e.g. storage devices 120), and/or other components according to the method 800 illustrated by blocks 810-890 of FIG. 8. For example, blocks 810-830 may relate to a method 802 of processing logical map lookup commands and blocks 840-890 may relate to a method 804 for processing logical map update commands.

At block 810, a logical map lookup command may be received. For example, an SVC may send the host FTL services in a storage device a logical map lookup command for the portion of the complete host LBA logical map that is hosted in the storage device. The host LBA range may be included in the command to be used as a key to the relevant mapping information in the portion of the logical map.

At block 820, the mapping information requested in the logical map lookup command may be retrieved from the local portion of the logical map hosted in the receiving drive. For example, the host FTL services module may use the host LBA range to retrieve mapping information from a portion of the host FTL table stored in the storage device.

At block 830, the mapping information requested in the logical map lookup command may be returned to the component that sent the command. For example, the mapping information may be provided back to an SVC that sent the request for use in further read/write operations. In some embodiments, the mapping information may be requested by another function in the same storage device or requested by another storage device in the same array. The information may be returned to that requester through an internal or drive-to-drive communication.

At block 840, a logical map update command may be received. For example, an SVC may send the host FTL services in the storage device a logical map update command based on a host write command being written to a host LBA associated with the portion of the complete host LBA logical map that is hosted in the storage device. In some embodiments, the logical map update command may include the host LBA range for a write operation, new mapping information, and a storage device ID for a parity storage device.

At block 850, the prior mapping information relevant to the logical map update command may be retrieved from the local portion of the logical map hosted in the receiving drive. For example, the host FTL services module may use the host LBA range being written to retrieve prior mapping information from a portion of the host FTL table stored in the storage device.

At block 860, the prior mapping information may be XORed with the new mapping information received in the logical map update command. For example, the prior mapping information and the new mapping information may be XORed using a XOR module.

At block 870, a parity update command is sent from the host FTL services of the storage device with the LBA mapping information for the write destination storage device to a parity storage device. For example, the parity update command may include the XORed mapping information produced in block 860 and identify a XOR buffer allocated for parity calculation.

At block 880, a parity update complete status may be received from the host FTL services of the parity storage device. For example, the parity storage device may complete a series of operations, such as those described below with regard to FIG. 10, and return complete status.

At block 890, the mapping information in the local portion of the logical map is updated. For example, the host FTL services may use the new mapping information to update the portion of the LBA mapping information for the completed write.

Figure 9:
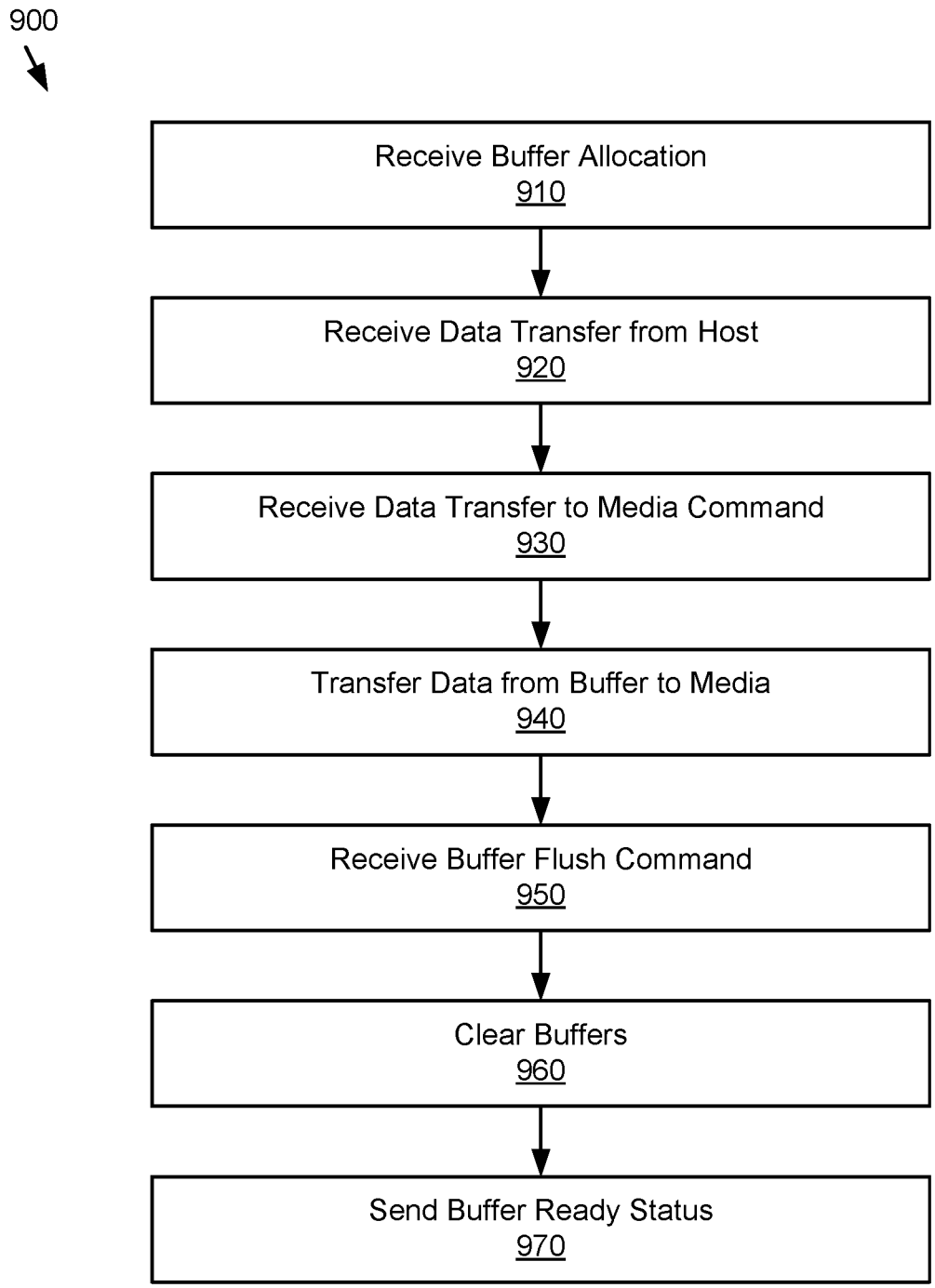
FIG. 9 illustrates an example of a method for distributed read/write operations using a destination storage device.

As shown in FIG. 9, the data storage system 100 may be operated according to distributed write operations where the destination storage device may execute write operations based on instructions from a buffer manager. For example, one or more storage devices (e.g. storage devices 120) may include a media manager (e.g. NVM manager 324) and remotely addressable buffer access (e.g. buffer access module 326) to execute one or more steps in communication with a storage virtualization controller (e.g. SVC 110), one or more other storage devices (e.g. storage devices 120), and/or other components according to the method 900 illustrated by blocks 910-970 of FIG. 9.

At block 910, a buffer allocation may be received. For example, a storage device may be notified that one or more buffer memory location will be receiving remote data access to write data into the buffer memory corresponding to host LBAs. In some embodiments, such allocations will follow page sizes supported by the storage medium or media in the storage device and buffer units may support matching page sizes.

At block 920, the host data may be received in the allocated buffer locations. For example, the buffers allocated in block 910 may be accessed by a remote memory access protocol, such as RDMA, to put the host data into the buffers. In some embodiments, blocks 910 and 920 may be executed simultaneously with the receipt of the host data effectively allocated the buffer space from the storage device perspective and a separate message (through a distinct command channel, data header/metadata, or a write to a log location in the buffer) may identify the destination LBA for the received data.

At block 930, a buffer transfer command may be received to transfer data in a buffer location to the storage medium or media of the storage device. For example, the buffer manager may send a buffer transfer command to the storage device when the RAID stripe is complete, the write is otherwise ready to be completed, or the buffer space is full. The buffer transfer command may not clear the buffer or enable it for allocation to another use.

At block 940, the data is transferred from the buffer to the storage medium or media. For example, a media manager may determine the storage location for the data on the storage medium or media, write the data from the buffer to the medium or media, and update the storage device FTL information (including mapping information) related to the write. In some embodiments, the data will remain in the buffer for use in parity calculations, data recovery in the event of power loss, or other subsequent operations.

At block 950, a buffer flush command may be received. For example, any data in the buffers not previously written to the storage medium or media may be transferred to medium or media. When all data has been transferred to medium or media and confirmed, operation may continue to block 960.

At block 960, buffers are cleared for reuse. For example, buffers may be reset to their ready state and any buffer allocations cleared. In some embodiments, this may include erasing all data present in the buffers being cleared.

At block 970, a buffer ready status is sent to identify cleared buffers as ready for additional use. For example, a buffer ready status may be provided to a remote buffer manager and/or a local buffer access module. In some embodiments, buffer ready status may be provided to other storage devices or components in the storage system that may remotely access the buffers for distributed services or operations.

Figure 10:
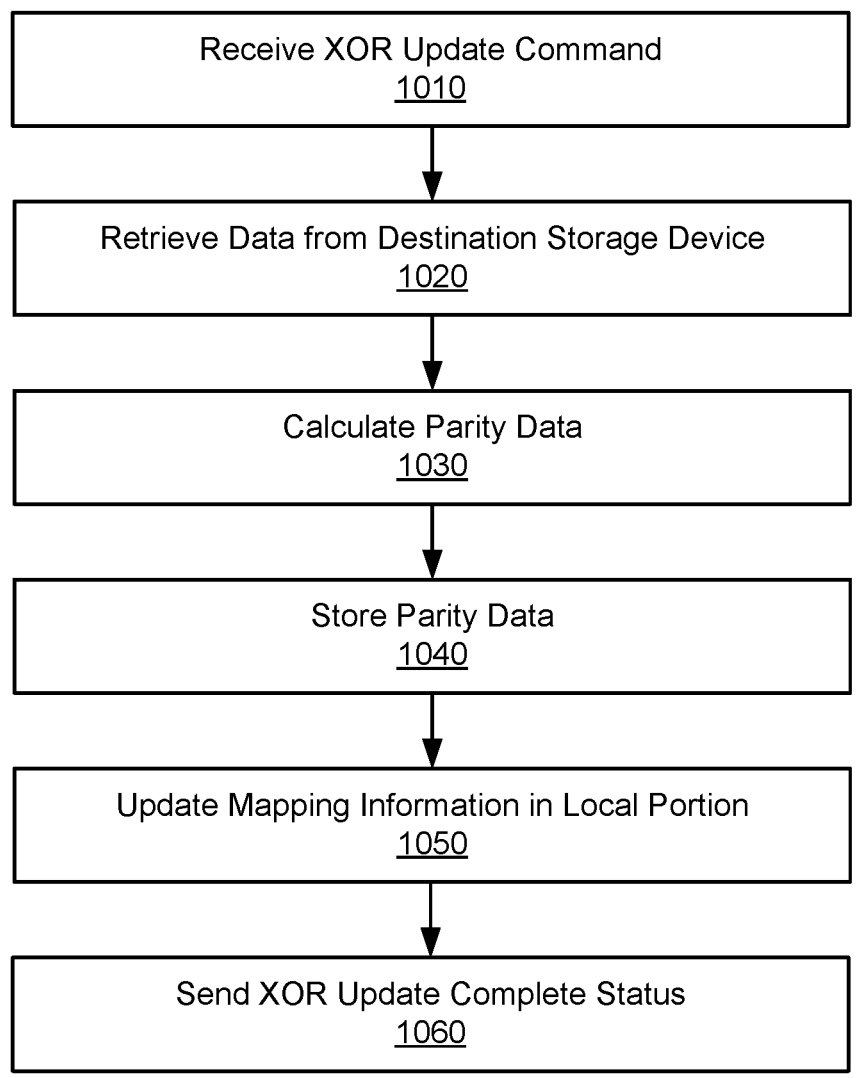
FIG. 10 illustrates an example of a method for distributed read/write operations using a parity storage device.

As shown in FIG. 10, the data storage system 100 may be operated according to distributed write operations where a parity storage device may execute parity operations based on instructions from the host FTL services of another storage device. For example, one or more storage devices (e.g. storage devices 120) may include a distributed parity module (e.g. distributed parity module 332) and XOR or other error coding function (e.g. XOR module 314) to execute one or more steps in communication with a storage virtualization controller (e.g. SVC 110), one or more other storage devices (e.g. storage devices 120), and/or other components according to the method 1000 illustrated by blocks 1010-1060 of FIG. 10.

At block 1010, a parity update command may be received by a parity storage device. For example, the host FTL services of the parity storage device may receive a parity update command including the XORed mapping information produced in block 860 in FIG. 8 and identifying a XOR buffer allocated for parity calculation.

At block 1020, the parity storage device may retrieve the write data. For example, the parity storage device may use a drive-to-drive direct memory access protocol, such as RDMA, to read from the buffer in the destination storage device for the original write command.

At block 1030, parity data may be calculated by the parity storage device. For example, the parity calculation may be accomplished by using the data read from the destination storage device for the original write command and XORing it with the current parity data in the parity storage device. In some embodiments, the parity storage device may have the current parity data in a XOR buffer (based on a prior parity calculation or moved there from the storage medium or media) associated with a XOR engine for performing the panty calculation.

At block 1040, the new parity data may be stored back in a buffer location. For example, after the new parity is calculated, the new parity data may be written back to the XOR buffer from which the old parity information was read.

At block 1050, the mapping information for the parity data may be updated in the local portion of the mapping information in the parity storage device. For example, the parity storage device may XOR the mapping information received in the parity update command with the corresponding information in the host FTL mapping table for the parity LBAs and store the results back in the relevant portion of the host FTL mapping for the parity LBAs.

At block 1060, the parity storage device sends status back to the component that sent the parity update command. For example, the parity storage device my send a parity update complete status to the host FTL services of the storage device that sent the command.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disc read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a storage controller configured for receiving a data request from a host system and comprising:
a first processor;
a first memory; and
a service mapping module stored in the first memory and executable by the first processor for identifying a target service host storage device from a plurality of storage devices, the target service host storage device hosting a target portion of a logical map of storage locations distributed among the plurality of storage devices; and
the plurality of storage devices in communication with the storage controller, each storage device of the plurality of storage devices comprising:
a second processor;
a second memory;
a storage medium;
a portion of the logical map stored in the second memory;
a service host module stored in the second memory and executable by the second processor for identifying a destination storage device from among the plurality of storage devices, the destination storage device corresponding to a target storage location for the data request based on the portion of the logical map;
a media manager stored in the second memory and executable by the second processor for processing a data transfer between the target storage location on the storage medium and the host system; and
a host logical map update module stored in the second memory and executable by the second processor for updating the portion of the logical map stored in the second memory based on the data transfer between the target storage location on the storage medium and the host system.

2. The storage system of claim 1, wherein each storage device further comprises:
a buffer memory; and
a remote direct memory access (RDMA) interface for accessing the buffer memory over an interconnect fabric external to the plurality of storage devices, wherein:
the media manager transfers data between the target storage location on the storage medium and the buffer memory; and
the host system transfers data between the host system and the buffer memory.

3. The storage system of claim 2, wherein the storage controller further comprises:
a buffer manager stored in the first memory and executable by the first processor for:
allocating the buffer memory for processing of the data request;
sending a data transfer command to the destination storage device to transfer data between the target storage location and the allocated buffer memory; and
sending a buffer access command to the host system to transfer data between the host system and the allocated buffer memory.

4. The storage system of claim 3, wherein:
the data request includes a plurality of host write commands; and
the data transfer command is executed after a full redundant array of independent disk (RAID) stripe for the data request has been assembled in the buffer memory of the plurality of storage devices.

5. The storage system of claim 3, wherein:
the data request includes a host write command with a host block size; and
the buffer manager is further executable for serializing a plurality of data requests across the buffer memory to fill a storage device write size that is a multiple of the host block size greater than one.

6. The storage system of claim 3, wherein:
the storage medium is configured for receiving data units of a predefined size; and
the buffer memory is allocated in the data units of the predefined size.

7. The storage system of claim 1, wherein:
the target portion of the logical map includes a parity identifier for a target parity storage device from among the plurality of storage devices; and
each storage device of the plurality of storage devices further comprises:
a XOR buffer; and
a parity module stored in the second memory and executable by the second processor for:
receiving data from the destination storage device;
calculating parity data from the received data; and
storing the parity data in the XOR buffer.

8. The storage system of claim 7, wherein the parity module is further executable for:
receiving mapping information related to the received data; and
updating a parity storage location in the portion of the logical map stored in the second memory using the received mapping information.

9. The storage system of claim 1, wherein each storage device of the plurality of storage devices further comprises:
a media logical map stored in the second memory and identifying media storage locations in the storage medium having a storage device write size, wherein the storage device write size is larger than a host write size of the data request and the portion of the host logical map uses the host write size for mapping data locations.

10. The storage system of claim 1, wherein the target service host storage device and the destination storage device are different storage devices among the plurality of storage devices.

11. A computer-implemented method, comprising:
receiving a write data request from a host system at a storage controller for a plurality of storage devices;
identifying a target service host storage device from the plurality of storage devices, the target service host storage device hosting a target portion of a logical map of storage locations distributed among the plurality of storage devices;
identifying a destination storage device from among the plurality of storage devices, the destination storage device corresponding to a target storage location for the write data request;
processing a data transfer from the host system to the destination storage device for the write data request; and
updating the target portion of the logical map in the target service host storage device based on the data transfer between the host system and the destination storage device, wherein the target service host storage device and the destination storage device are different storage devices among the plurality of storage devices.

12. The computer-implemented method of claim 11, wherein:
processing the data transfer further comprises:
transferring data between the host system and a buffer memory in the destination storage device; and
transferring data between the buffer memory and the target storage location on a storage medium of the destination storage device.

13. The computer-implemented method of claim 12, further comprising:
allocating the buffer memory of the plurality of storage devices for processing of the write data request;
sending a buffer access command to the host system to transfer data between the host system and the allocated buffer memory; and
sending a data transfer command to the destination storage device to transfer data between the allocated buffer memory and the target storage location on the storage medium of the destination storage device.

14. The computer-implemented method of claim 13, further comprising:
assembling a full stripe for the write data request in the buffer memory of the destination storage device, wherein the data transfer command is sent after the full stripe for the data request has been assembled in the buffer memory.

15. The computer-implemented method of claim 13, further comprising:
serializing a plurality of write data requests across a plurality of buffer memories in the plurality of storage devices.

16. The computer-implemented method of claim 13, wherein:
the storage medium is configured for receiving data units of a predefined size; and
the buffer memory is allocated in the data units of the predefined size.

17. The computer-implemented method of claim 11, further comprising:
identifying a target parity storage device from among the plurality of storage devices; and
the target parity storage device:
receiving data from the destination storage device;
calculating parity data from the received data; and
storing the parity data in a XOR buffer of the target parity storage device.

18. The computer-implemented method of claim 17, further comprising:
receiving mapping information related to the received data in the target parity storage device; and
updating a parity storage location in a portion of the logical map stored in the target parity storage device using the received mapping information.

19. The computer-implemented method of claim 18, wherein the destination storage device and the target parity storage device are different storage devices among the plurality of storage devices.

20. A system, comprising:
means for receiving a write data request from a host system at a storage controller for a plurality of storage devices;
means for identifying a target service host storage device from the plurality of storage devices, the target service host storage device hosting a target portion of a logical map of storage locations distributed among the plurality of storage devices;
means for identifying a destination storage device from among the plurality of storage devices, the destination storage device corresponding to a target storage location for the write data request;
means for processing a data transfer from the host system to the destination storage device for the write data request; and
means for updating the portion of the logical map in the target service host storage device based on the data transfer between the host system and the destination storage device, wherein the target service host storage device and the destination storage device are different storage devices among the plurality of storage devices.

* * * * *